United States Patent
Yamada

(10) Patent No.: US 10,576,753 B2
(45) Date of Patent: Mar. 3, 2020

(54) IMAGE FORMING APPARATUS

(71) Applicant: Konica Minolta Inc., Tokyo (JP)

(72) Inventor: Tatsutoshi Yamada, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/162,951

(22) Filed: Oct. 17, 2018

(65) Prior Publication Data

US 2019/0152235 A1 May 23, 2019

(30) Foreign Application Priority Data

Nov. 17, 2017 (JP) ................... 2017-222041

(51) Int. Cl.
  *B41J 2/44* (2006.01)
  *H04N 1/203* (2006.01)
  *H04N 1/113* (2006.01)
  *B41J 2/47* (2006.01)

(52) U.S. Cl.
  CPC .......... *B41J 2/44* (2013.01); *B41J 2/442* (2013.01); *B41J 2/471* (2013.01); *H04N 1/113* (2013.01); *H04N 1/2032* (2013.01)

(58) Field of Classification Search
  CPC ................................................ B41J 2/44
  USPC ................................................ 358/481
  See application file for complete search history.

(56) References Cited

U.S. PATENT DOCUMENTS

| 10,345,749 B2* | 7/2019 | Yamada | |
| 2009/0245827 A1* | 10/2009 | Matsumoto | G03G 15/5029 399/45 |
| 2015/0177663 A1* | 6/2015 | Namiki | G01N 29/27 399/45 |
| 2016/0349639 A1* | 12/2016 | Ota | G03G 9/0819 |
| 2017/0269501 A1* | 9/2017 | Kamikura | G03G 15/043 |

FOREIGN PATENT DOCUMENTS

JP 2002202691 A 7/2002

* cited by examiner

*Primary Examiner* — Jacky X Zheng
(74) *Attorney, Agent, or Firm* — Lucas & Mercanti, LLP

(57) ABSTRACT

An image forming apparatus includes: a light source that emits a laser beam; a polygon mirror that reflects the laser beam; a photoreceptor that is to be exposed to the laser beam reflected by the polygon mirror; a motor that rotates the polygon mirror; and a hardware processor capable of detecting sheet type, that is, type of a sheet conveyed in the image forming apparatus, wherein the hardware processor controls to rotate the motor at a first rotation speed until the sheet type is detected, and rotate the motor at a second rotation speed determined on the basis of the sheet type after detection of the sheet type.

16 Claims, 21 Drawing Sheets

FIG. 7

| | PLAIN SHEET | THICK SHEET 1 | THICK SHEET 2 |
|---|---|---|---|
| GRAMMAGE (g/m²) | 60 TO 90 | 91 TO 157 | 158 TO 300 |
| SYSTEM SPEED (mm/s) | 325 | 162.5 | 108.3 |
| RESOLUTION (dpi) | 600 | 600 | 600 |
| NO. OF MIRROR SURFACES | 7 | 7 | 7 |
| NO. OF BEAMS | 2 | 2 | 2 |
| EXPOSURE ROTATION SPEED (rpm) | 33000 | 16000 | 11000 |

D2

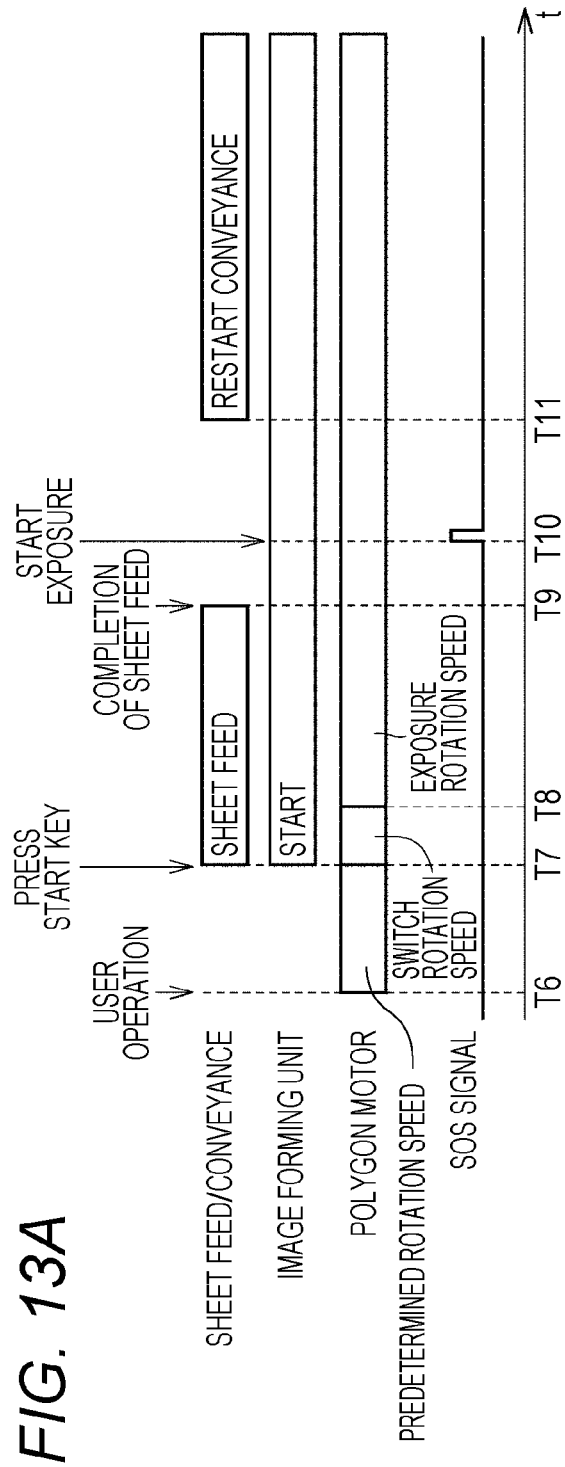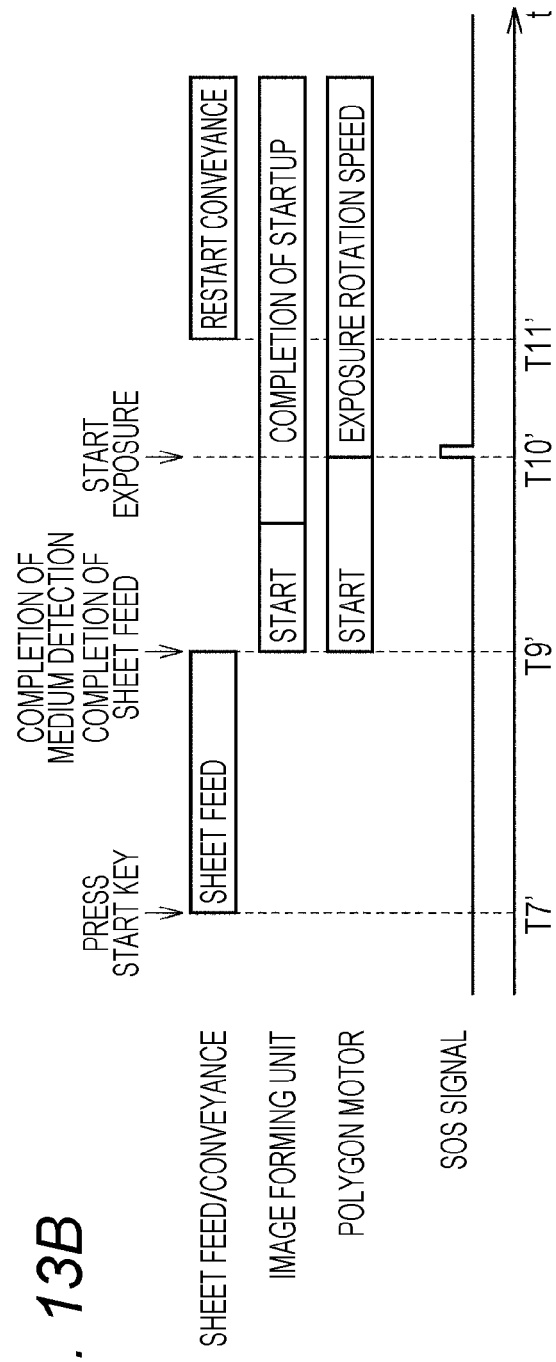

IMAGE FORMING APPARATUS

The entire disclosure of Japanese patent Application No. 2017-222041, filed on Nov. 17, 2017, is incorporated herein by reference in its entirety.

BACKGROUND

Technological Field

The present disclosure relates to an image forming apparatus, and more specifically relates to control of a polygon motor of an image forming apparatus.

Description of the Related Art

Image forming apparatuses such as multi functional peripheral (MFP) are spreading. An electrophotographic image forming apparatus executes steps as printing steps including: a step of charging a photoreceptor; a step of exposing a photoreceptor according to an input image pattern; and a step of attaching toner to an electrostatic latent image formed by the exposure.

In order to expose the photoreceptor, a polygon mirror that reflects the laser beam emitted from a light source is rotated at a high speed in the image forming apparatus. The rotation speed of the polygon mirror is set according to the sheet type, that is, the type of the sheet as an image formation target.

As a technique related to the rotation control of the polygon motor, for example, JP 2002-202691 A discloses an image forming apparatus that determines the rotation speed of the polygon motor in accordance with the thickness of the transfer sheet detected by a sheet thickness detection unit (paragraph [0019]).

The above-described conventional technique, however, sets the rotation speed of the polygon motor after detecting the sheet type and thereafter controls the rotation of the polygon motor in accordance with the set rotation speed, leading to an increase in time to start the rotation of the polygon motor, causing a problem of suspending the start of succeeding image forming processing. Therefore, there is a need for a technique to promptly start the polygon motor.

SUMMARY

The present disclosure has been made to solve the above problems, and an object of a certain aspect is to reduce time for starting a polygon motor.

To achieve the abovementioned object, according to an aspect of the present invention, an image forming apparatus reflecting one aspect of the present invention comprises: a light source that emits a laser beam; a polygon mirror that reflects the laser beam; a photoreceptor that is to be exposed to the laser beam reflected by the polygon mirror; a motor that rotates the polygon mirror; and a hardware processor capable of detecting sheet type, that is, type of a sheet conveyed in the image forming apparatus, wherein the hardware processor controls to rotate the motor at a first rotation speed until the sheet type is detected, and rotate the motor at a second rotation speed determined on the basis of the sheet type after detection of the sheet type.

BRIEF DESCRIPTION OF THE DRAWINGS

The objects, advantages, aspects, and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating an example of a sheet type table;

FIGS. 13A and 13B are timing charts illustrating an overview of rotation control of a polygon motor according to the second embodiment;

DETAILED DESCRIPTION OF EMBODIMENTS

Figure 1:
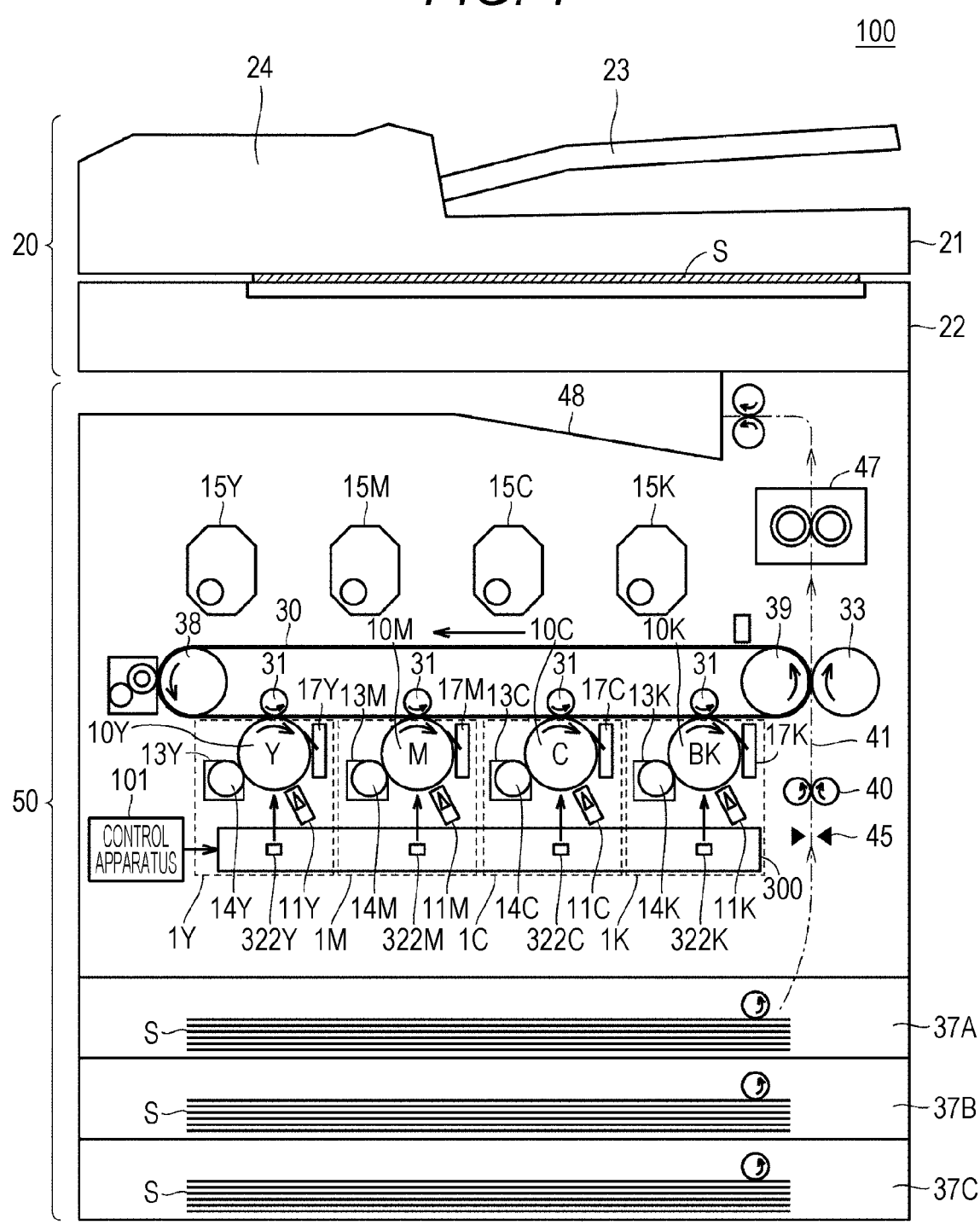
FIG. 1 is a diagram illustrating an example of an apparatus configuration of an image forming apparatus.

Hereinafter, one or more embodiments of the present invention will be described with reference to the drawings. However, the scope of the invention is not limited to the disclosed embodiments. In the following description, the same components and constituent elements are denoted by the same reference numerals. Their names and functions are also the same. Therefore, detailed description of these will not be repeated. Note that each of embodiments and each of modifications described below may be selectively combined as appropriate.

First Embodiment

[1. Image Forming Apparatus 100]

An image forming apparatus 100 according to a first embodiment will be described with reference to FIG. 1. FIG. 1 is a diagram illustrating an example of an apparatus configuration of the image forming apparatus 100.

FIG. 1 illustrates the image forming apparatus 100 as a color printer. Hereinafter, the image forming apparatus 100 as a color printer will be described, although the image forming apparatus 100 is not limited to the color printer. For example, the image forming apparatus 100 may be a monochrome printer, or may be a multi-functional peripheral (MFP) incorporating a monochrome printer, a color printer, and a FAX.

The image forming apparatus 100 includes a scanner 20 and a printer 50. The scanner 20 includes a cover 21, a sheet base 22, a tray 23, and an auto document feeder (ADF) 24. With one end of the cover 21 fixed to the sheet base 22, the cover 21 is configured to be openable and closable with the one end used as a fulcrum. A user of the image forming apparatus 100 can open the cover 21 to set the sheet on the sheet base 22. After accepting a scan instruction in a state where a sheet is set on the sheet base 22, the image forming apparatus 100 starts scanning the sheet set on the sheet base 22. Furthermore, after reception of the scan instruction by the image forming apparatus 100 with the sheet set in the tray 23, the sheets are automatically read one by one by the ADF 24.

The printer 50 includes image forming units 1Y, 1M, 1C, and 1K, an intermediate transfer belt 30, a primary transfer roller 31, a secondary transfer roller 33, cassettes 37A to 37C, a driven roller 38, a driving roller 39, a registration roller 40, a fixing apparatus 47, and a control apparatus 101.

The image forming units 1Y, 1M, 1C, and 1K are arranged in this order along the intermediate transfer belt 30. The image forming unit 1Y receives toner supplied from the toner bottle 15Y and forms a yellow (Y) toner image. The image forming unit 1M receives toner supplied from the toner bottle 15M and forms a magenta (M) toner image. The image forming unit 1C receives toner supplied from the toner bottle 15C and forms a cyan (C) toner image. The image forming unit 1K receives a toner supplied from the toner bottle 15K and forms a black (BK) toner image.

The image forming unit 1Y includes a photoreceptor 10Y, a charging apparatus 11Y, a light source 322Y, a developing apparatus 13Y, and a cleaning apparatus 17Y. The image forming unit 1M includes a photoreceptor 10M, a charging apparatus 11M, a light source 322M, a developing apparatus 13M, and a cleaning apparatus 17M.

The image forming unit 1C includes a photoreceptor 10C, a charging apparatus 11C, a light source 322C, a developing apparatus 13C, and a cleaning apparatus 17C. The image forming unit 1K includes a photoreceptor 10K, a charging apparatus 11K, a light source 322K, a developing apparatus 13K, and a cleaning apparatus 17K.

In the following description, the photoreceptors 10Y, 10M, 10C, and 10K are collectively referred to as the photoreceptor 10. The charging apparatuses 11Y, 11M, 11C, 11K are collectively referred to as the charging apparatus 11. The light sources 322Y, 322M, 322C, and 322K are collectively referred to as the light source 322. The developing apparatuses 13Y, 13M, 13C, and 13K are collectively referred to as the developing apparatus 13. The cleaning apparatuses 17Y, 17M, 17C and 17K are collectively referred to as the cleaning apparatus 17.

The charging apparatus 11 uniformly charges a surface of the photoreceptor 10. The light source 322 emits a laser beam onto the photoreceptor 10 in accordance with a control signal from the control apparatus 101 and exposes the surface of the photoreceptor 10 in accordance with an input image pattern. With this procedure, an electrostatic latent image corresponding to an input image is formed on the photoreceptor 10. The light source 322 is provided in a print head 350. Details of the print head 350 will be described below.

The developing apparatus 13 applies a developing bias to the developing roller 14 while rotating the developing roller 14, and allows the toner to adhere to the surface of the developing roller 14. This allows the toner to be transferred from the developing roller 14 to the photoreceptor 10, and a toner image corresponding to the electrostatic latent image formed on the photoreceptor 10 is developed on the surface of the photoreceptor 10.

The photoreceptor 10 and the intermediate transfer belt 30 are in contact with each other at a portion in which the primary transfer roller 31 is provided. With application of a transfer voltage having a polarity opposite to the polarity of the toner image to the primary transfer roller 31, the toner image is transferred from the photoreceptor 10 to the intermediate transfer belt 30. At this time, toner images of yellow (Y), magenta (M), cyan (C), and black (BK) are sequentially superposed in this order and transferred to the intermediate transfer belt 30 from the photoreceptor 10. With this procedure, a colored toner image is formed on the intermediate transfer belt 30.

The intermediate transfer belt 30 is stretched by the driven roller 38 and the driving roller 39. The driving roller 39 is rotationally driven by a motor (not illustrated). The intermediate transfer belt 30 and the driven roller 38 rotate in conjunction with the driving roller 39. With this configuration, the toner image on the intermediate transfer belt 30 is conveyed to a transfer region on the secondary transfer roller 33.

The cleaning apparatus 17 is in pressure contact with the photoreceptor 10. The cleaning apparatus 17 collects the toner remaining on the surface of the photoreceptor 10 after transfer of the toner image.

Sheets of different sizes or types are set in each of the cassettes 37A to 37C. Hereinafter, the cassettes 37A to 37C are collectively referred to as the cassette 37. The sheet conveyed from the cassette 37 into a conveyance path 41 is transmitted to the secondary transfer roller 33 by the registration roller 40.

A sheet sensor 45 is disposed in front of the registration roller 40. The sheet sensor 45 is formed with a reflective photosensor and a transmissive photosensor, and detects the grammage of the sheet conveyed in the conveyance path 41.

The sheet sensor 45 is arranged so as to detect grammage of the sheet conveyed between the cassette 37 and the registration roller 40. With this configuration, it is possible not merely to realize cost reduction due to reduction in the number of sheet sensors 45 but also to reduce the time of suspending the succeeding processing after the detection of the sheet type, as compared with the case having the plurality of sheet sensors 45 provided in each of the cassettes 37.

The secondary transfer roller 33 applies a transfer voltage having a polarity opposite to the polarity of the toner image to the sheet being conveyed. This operation attracts the toner image from the intermediate transfer belt 30 to the secondary transfer roller 33, allowing the toner image on the intermediate transfer belt 30 to be transferred. The timing of conveying the sheet to the secondary transfer roller 33 is adjusted by the registration roller 40 in accordance with the position of the toner image on the intermediate transfer belt 30. With the use of the registration roller 40, the toner image on the intermediate transfer belt 30 is transferred to an appropriate position on the sheet.

The fixing apparatus 47 pressurizes and heats the sheet passing therethrough. As a result, the toner image is fixed on the sheet. Thereafter, the sheet is discharged onto the tray 48.

[2. Print Head 350]

Figure 2:
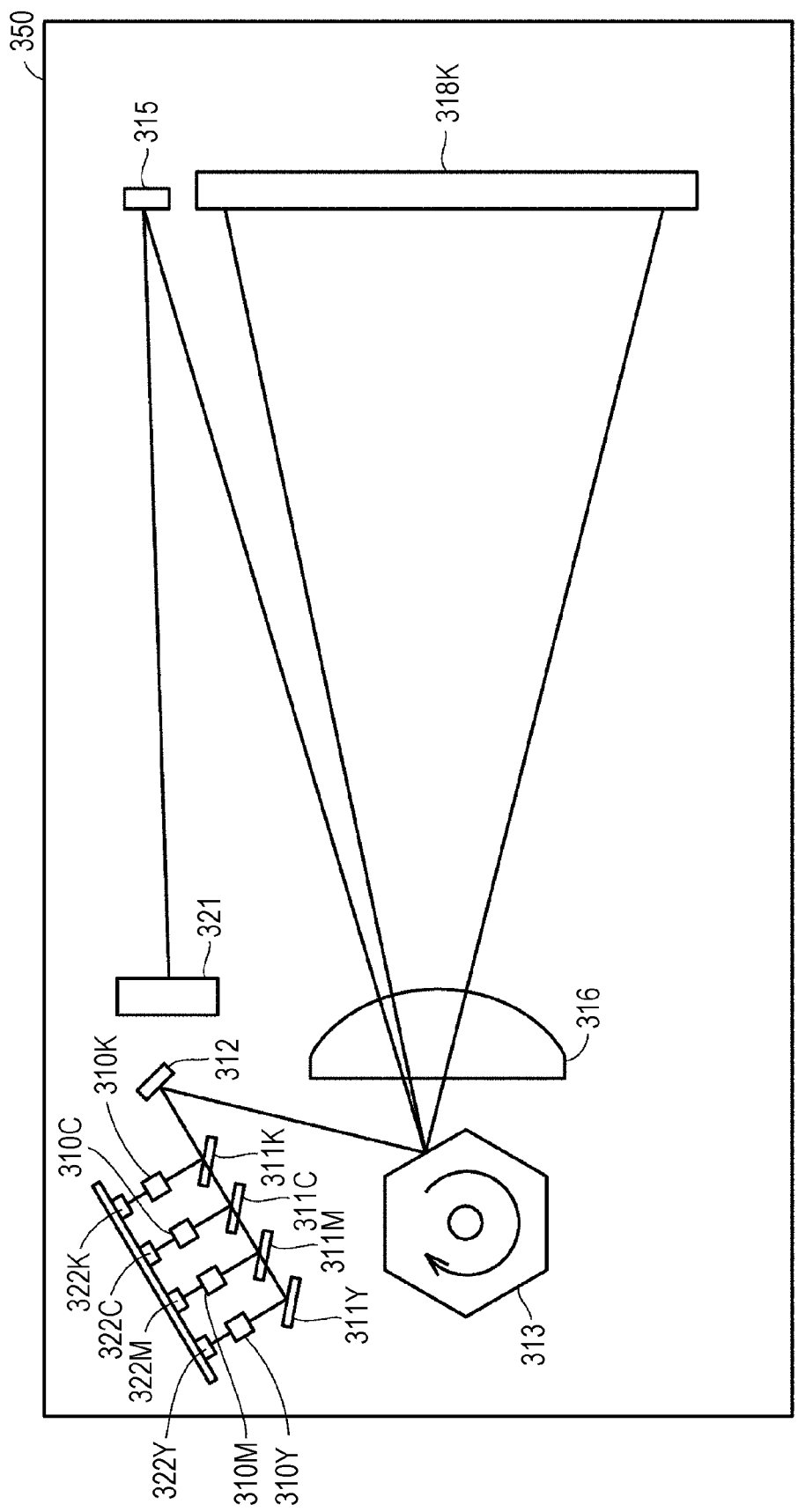
FIG. 2 is a plan view illustrating an internal structure of a print head.
Figure 3:
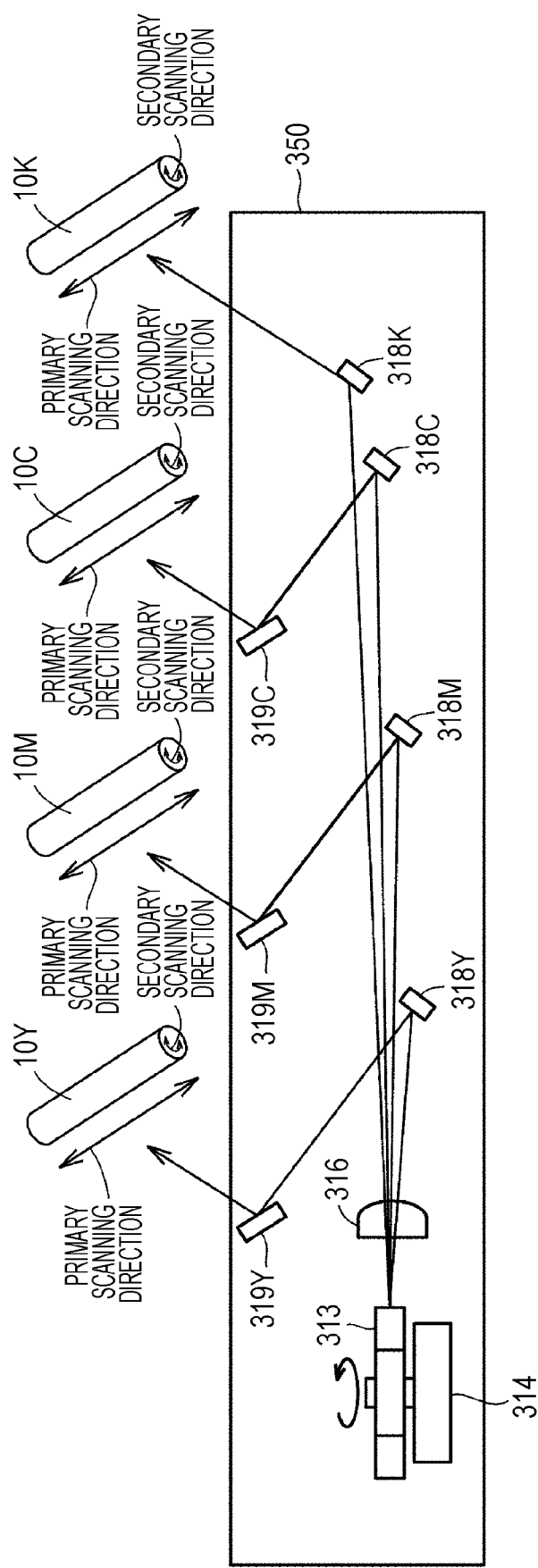
FIG. 3 is a schematic diagram illustrating a relationship between a print head and a photoreceptor.

With reference to FIGS. 2 and 3, an internal structure of the print head 350 will be described. FIG. 2 is a plan view illustrating an internal structure of the print head 350. FIG. 3 is a schematic diagram illustrating a relationship between the print head 350 and the photoreceptor 10.

As illustrated in FIG. 2, the print head 350 includes light sources 322Y, 322M, 322C, and 322K, collimator lenses 310Y, 310M, 310C, and 310K, mirrors 311Y, 311M, 311C, and 311K, a mirror 312, a polygon mirror 313, a polygon motor 314, an fθ lens 316, mirrors 318Y, 318M, 318C, and 318K, mirrors 319Y, 319M, and 319C, a mirror 315, and a light sensor 321.

Hereinafter, the path of the laser beam will be described focusing on the laser beam emitted from the light source 322K. The laser beam emitted from the light source 322K is collected by the collimator lens 310K and applied to the mirror 311K. The mirror 311K reflects the laser beam that has passed through the collimator lens 310K to the mirror 312. The mirror 312 reflects the laser beam to the polygon mirror 313.

The polygon mirror 313 as a rotating polygon mirror has a prismatic shape (for example, a hexagonal prism). Side surfaces of the polygon mirror 313 are constituted with mirrors. The polygon mirror 313 is rotationally driven by the polygon motor 314. The polygon mirror 313 reflects the laser beam while rotating to regularly change the reflection direction of the laser beam. The polygon mirror 313 reflects the laser beam to the fθ lens 316 while rotating. The laser beam that has passed through the fθ lens 316 is reflected by the mirror 318 to the photoreceptor 10K (refer to FIG. 1).

As illustrated in FIG. 3, the image forming apparatus 100 rotates the photoreceptor 10K while rotating the polygon mirror 313 so as to scan the laser beam reflected by the polygon mirror 313 on the photoreceptor 10K. At this time, one line in a primary scanning direction of the photoreceptor 10K is scanned by a mirror on one surface of the polygon mirror 313. The primary scanning direction indicates the direction of the rotation axis of the photoreceptor 10. In the case of polygon mirror 313 composed of six mirrors, one rotation of the polygon mirror 313 enables scanning of six lines of the photoreceptor 10K in the primary scanning direction. The image forming apparatus 100 switches on/off the light source 322K in accordance with an input image pattern to expose a certain position on the photoreceptor 10K. With this procedure, an electrostatic latent image corresponding to an input image is formed on the photoreceptor 10K.

Similarly, the laser beam emitted from the light source 322Y is reflected by the polygon mirror 313 onto the photoreceptor 10Y. The laser beam emitted from the light source 322M is reflected by the polygon mirror 313 onto the photoreceptor 10M. The laser beam emitted from the light source 322C is reflected by the polygon mirror 313 onto the photoreceptor 10C. With the mirrors 311Y, 311M, 311C, 311K arranged with a step, the laser beams emitted from the light sources 322Y, 322M, 322C, and 322K are reflected onto the photoreceptors 10Y, 10M, 10C, and 10K, respectively.

The photoreceptors 10Y, 10M, 10C, and 10K have a cylindrical shape and are configured to be rotatable in a circumferential direction. Here, as illustrated in FIG. 3, the longitudinal direction of the cylindrical shape is defined as the primary scanning direction, and the circumferential direction is defined as a secondary scanning direction. The secondary scanning direction corresponds to the sheet conveyance direction. The image forming apparatus 100 sets the magnification in the secondary scanning direction in a case of enlarging or reducing the magnification of an image formed on the sheet.

[3. Hardware Configuration]

Figure 4:
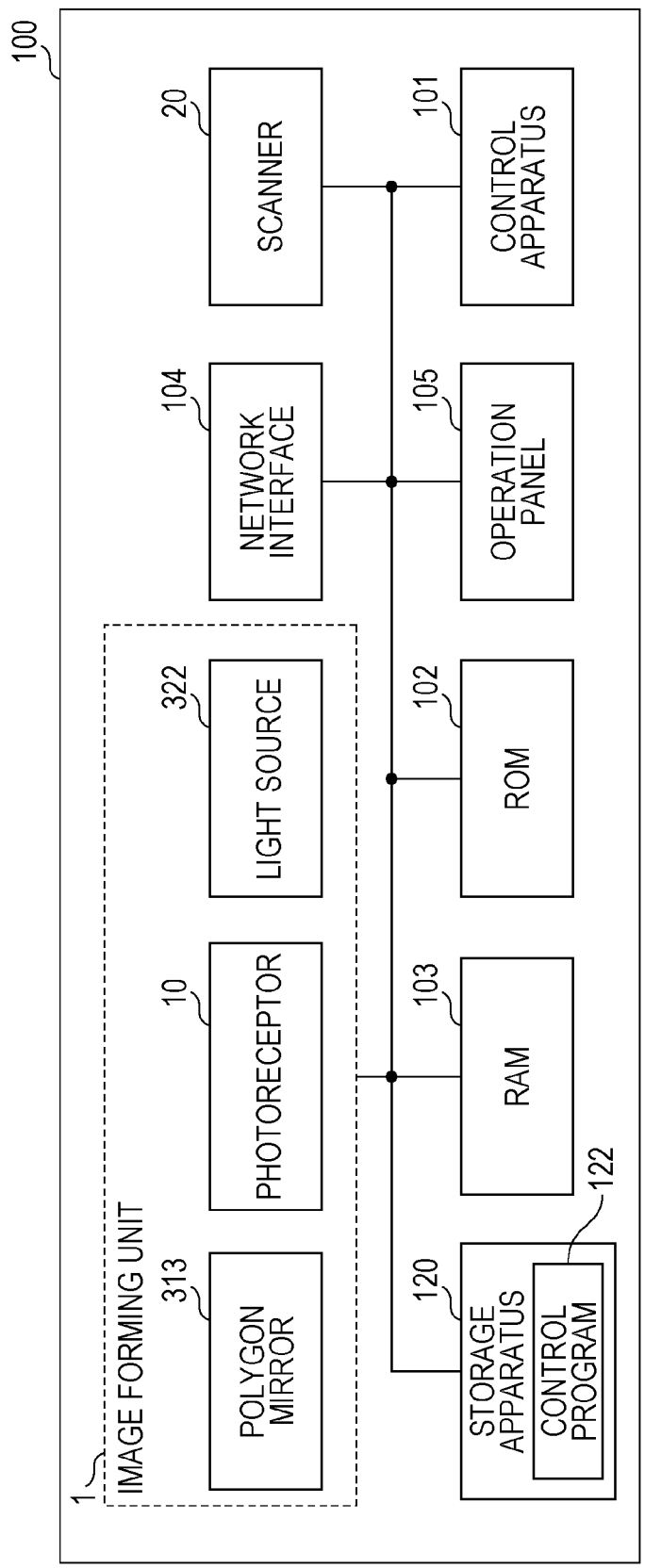
FIG. 4 is a block diagram illustrating a main hardware configuration of an image forming apparatus.

An exemplary hardware configuration of the image forming apparatus 100 will be described with reference to FIG. 4. FIG. 4 is a block diagram illustrating the main hardware configuration of the image forming apparatus 100.

As illustrated in FIG. 4, the image forming apparatus 100 includes the control apparatus 101, an operation panel 105, a read only memory (ROM) 102, a random access memory (RAM) 103, a storage apparatus 120, the scanner 20, a network interface 104, and the image forming unit 1.

The control apparatus 101 includes at least one integrated circuit. The integrated circuit includes at least one central processing unit (CPU), at least one application specific integrated circuit (ASIC), at least one field programmable gate array (FPGA), or a combination of the above circuits.

The control apparatus 101 executes various programs such as a control program 122 that adjusts control parameters of the image forming apparatus 100 so as to control operation of the image forming apparatus 100. The control apparatus 101 loads the control program 122 from the storage apparatus 120 onto the RAM 103 on the basis of reception of an execution command of the control program 122. The RAM 103 functions as a working memory and temporarily stores a variety of data necessary for executing the control program 122.

An antenna (not illustrated) or the like are connected to the network interface 104. The image forming apparatus 100 exchanges data with an external communication apparatus via an antenna. The external communication device includes a mobile communication terminal such as a smartphone, a server, for example. The image forming apparatus 100 may be configured to be able to download the control program 122 from the server via the antenna.

The operation panel 105 includes a display and a touch screen. The display and the touch screen are overlapped with each other and receives operation in the form of touch operation onto the image forming apparatus 100. As an example, the operation panel 105 receives operation for executing control parameter adjustment processing or the like. The operation panel 105 includes a panel operation sensor that detects user's operation onto the panel. The panel operation sensor detects the start timing of pre-exposure rotation of rotating the polygon motor at a pre-exposure rotation speed.

The storage apparatus 120 is, for example, a hard disk, a solid state drive (SSD), or other storage apparatus. The storage apparatus 120 may be either a built-in type or an external type. The storage apparatus 120 stores the control program 122 or the like according to the present embodiment. The storage location of the control program 122 is not limited to the storage apparatus 120, and may be a storage region (for example, a cache) of the control apparatus 101, the ROM 102, the RAM 103, an external apparatus (for example, a server), or the like.

The control program 122 may be provided as a portion of a certain program, rather than a single program. In this case, control processing according to the present embodiment is implemented in cooperation with the certain program. Even programs not including some modules are within the scope of the control program 122 according to the present embodiment. Furthermore, a portion or all of the functions provided by the control program 122 may be implemented by dedicated hardware. Furthermore, the image forming apparatus 100 may be configured in a form of a cloud service in which at least one server executes a portion of the processing of the control program 122.

[4. Rotation Control of Polygon Motor 314]

Figure 5:
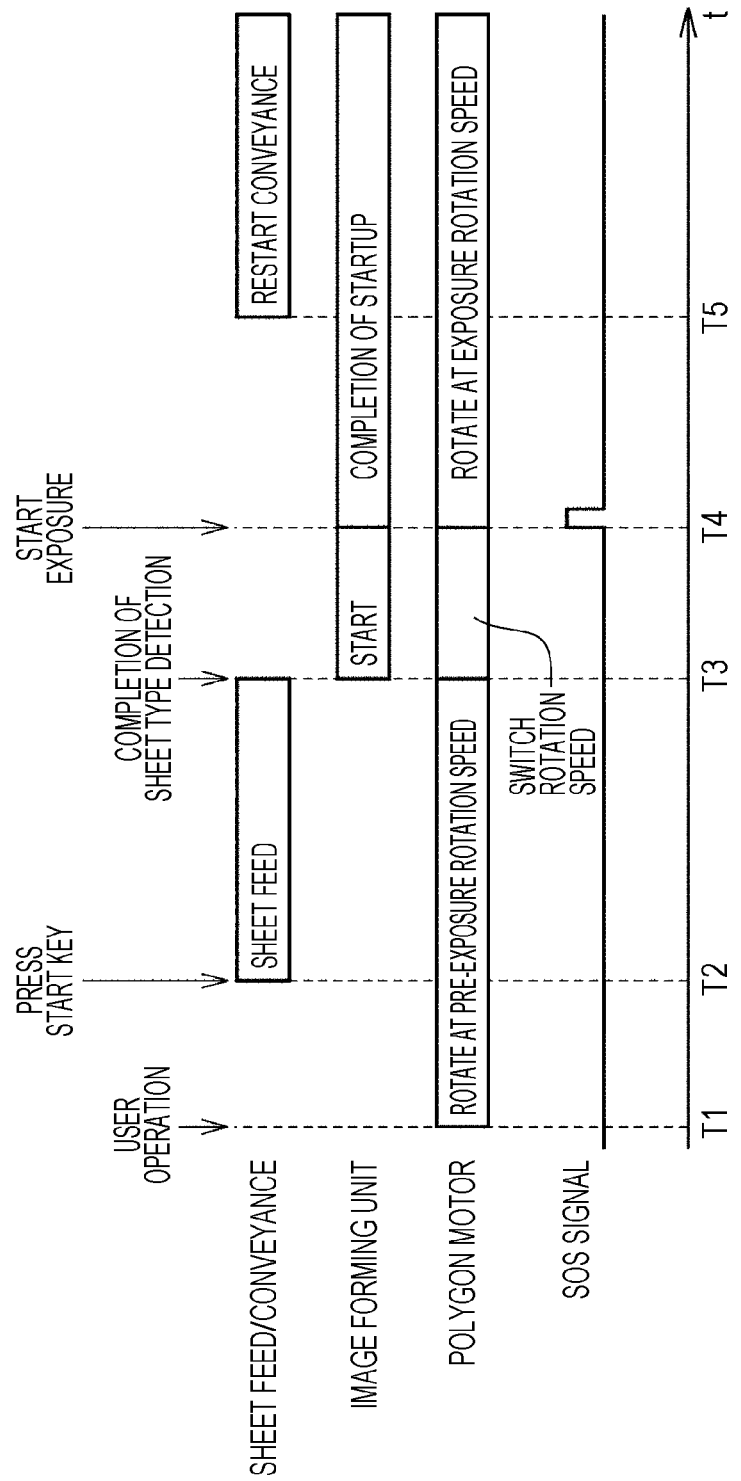
FIG. 5 is a timing chart illustrating an overview of rotation control of a polygon motor.

With reference to FIG. 5, an overview of rotation control of the polygon motor 314 according to the present embodiment will be described. FIG. 5 is a timing chart illustrating an overview of rotation control of the polygon motor 314.

As illustrated in FIG. 5, the image forming apparatus 100 according to the present embodiment is configured such that the polygon motor 314 rotates at a pre-exposure rotation speed (corresponding to a first rotation speed) in response to the user's certain operation on the operation panel 105 at a certain timing (t=T1). The "pre-exposure rotation speed" here represents a rotation speed of the polygon motor 314 before exposure to the photoreceptor 10 is started. Feeding of the sheets in the cassette 37 is started at a timing (t=T2) at which the user presses a start key to instruct the start of printing.

Thereafter, the sheet type, that is, the type of sheet conveyed in the conveyance path is detected by the sheet sensor 45 (t=T3). After detection of the sheet type by the sheet sensor 45, an exposure rotation speed (corresponding to a second rotation speed) is determined on the basis of the detected sheet type, and then, the rotation speed of the polygon motor 314 is switched from the pre-exposure rotation speed to the exposure rotation speed. The "exposure rotation speed" here represents the rotation speed of the polygon motor 314 after exposure to the photoreceptor 10 is started. The sheet in the conveyance path 41 stands ready at the registration roller 40 for adjusting the timing of being fed out to the secondary transfer roller 33.

At completion of the switching of the polygon motor 314 to the exposure rotation speed (t=T4), the exposure of the photoreceptor 10 in the print head 350 is started. At arrival of a timing (t=T5) to convey the sheet to the secondary transfer roller 33, the conveyance of the sheet is restarted by the registration roller 40, and a toner image is formed on the sheet.

Figure 6A:
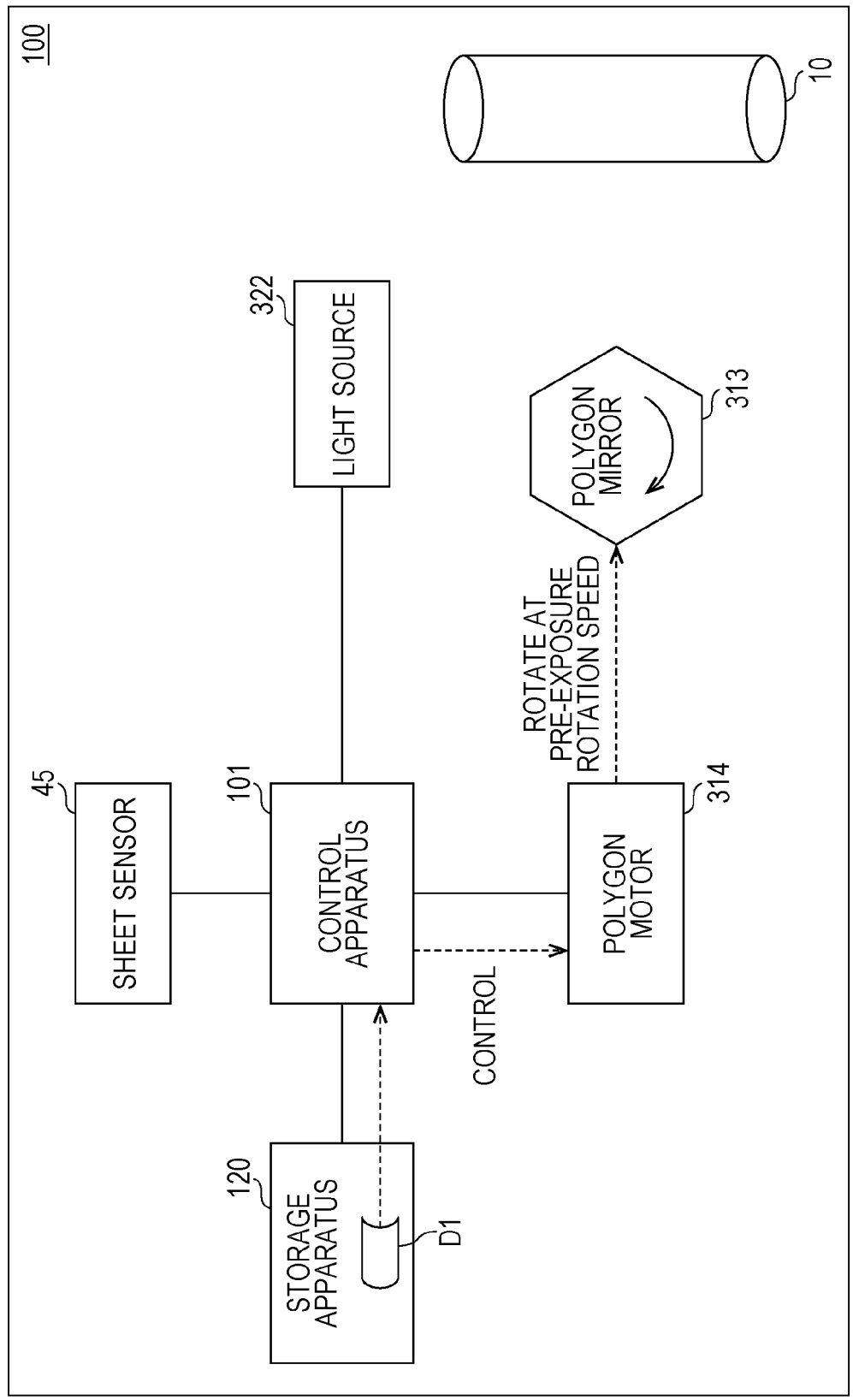
FIGS. 6A and 6B are diagrams illustrating a mode of rotation control of a polygon motor.
Figure 6B:
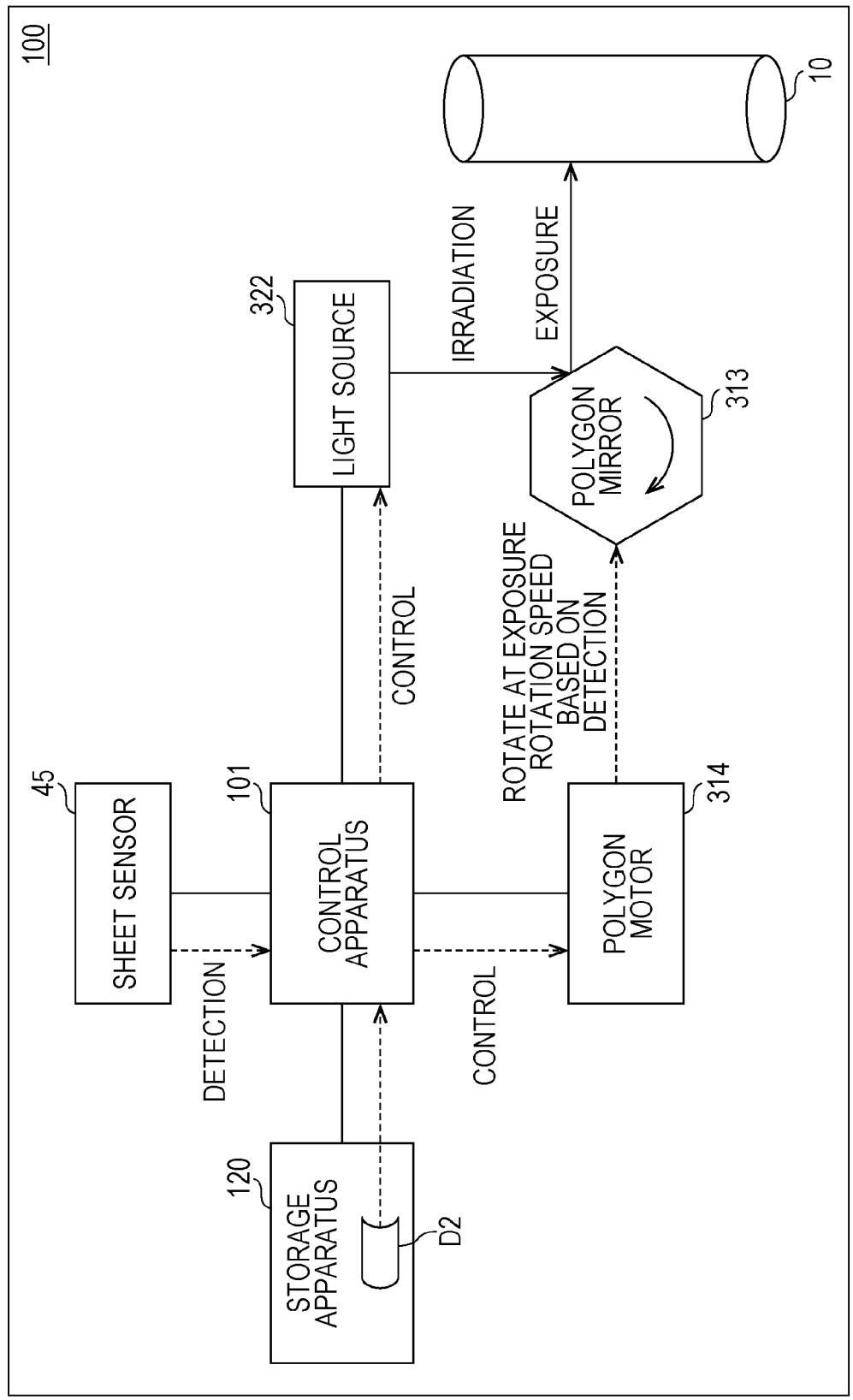

Referring to FIGS. 6A and 6B, rotation control of the polygon motor 314 will be described. FIGS. 6A and 6B are diagrams illustrating a mode of rotation control of the polygon motor 314. FIG. 6A illustrates a control mode before start of the exposure to the photoreceptor 10, and FIG. 6B illustrates a control mode after start of the exposure to the photoreceptor 10.

As illustrated in FIG. 6A, the control apparatus 101 of the image forming apparatus 100 controls to rotate the polygon motor 314 at the pre-exposure rotation speed until the sheet sensor 45 in the conveyance path 41 detects the sheet type. The control apparatus 101 determines the pre-exposure rotation speed of the polygon motor 314 on the basis of a rotation speed history table D1 stored in the storage apparatus 120. A method of determining the pre-exposure rotation speed based on the rotation speed history table D1 will be described below.

As illustrated in FIG. 6B, after detection of the sheet type by the sheet sensor 45, the control apparatus 101 determines the exposure rotation speed on the basis of the detected sheet type and a sheet type table D2 stored in the storage apparatus 120. The control apparatus 101 controls to rotate the polygon motor 314 at the determined exposure rotation speed.

FIG. 7 is a diagram illustrating an example of the sheet type table D2. As illustrated in FIG. 7, the sheet type table D2 prescribes grammage, system speed, resolution, the number of mirror surfaces, the number of beams, and the exposure rotation speed according to the sheet type (plain sheet, thick sheet, or the like). When the sheet sensor 45 detects the grammage of the sheet, the control apparatus 101 specifies the sheet type on the basis of the detection result. The control apparatus 101 controls to rotate the polygon motor 314 with the exposure rotation speed corresponding to the specified sheet type.

[5. Method of Determining Pre-Exposure Rotation Speed]

Figure 8A:
FIGS. 8A to 8C are diagrams illustrating examples of a rotation speed history table.
Figure 8B:
Figure 8C:
Figure 9A:
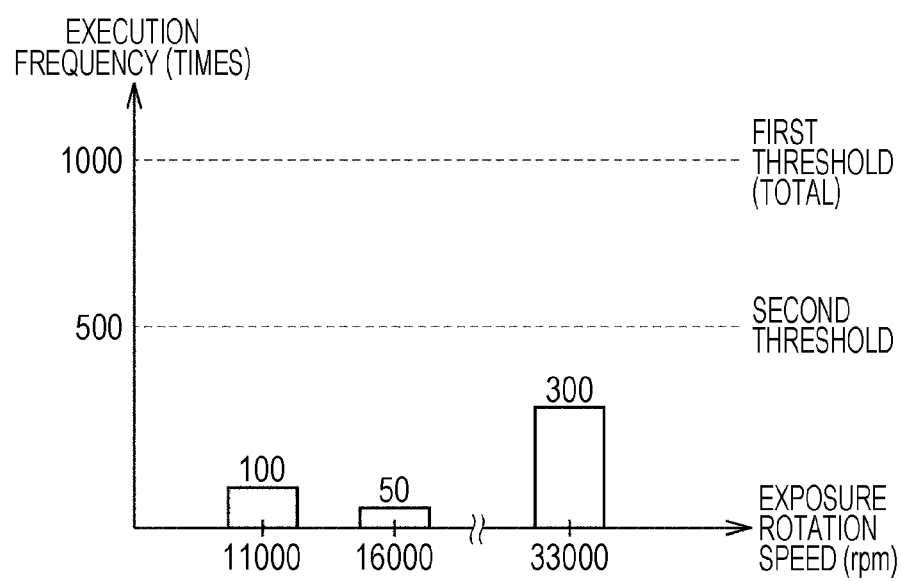
FIGS. 9A to 9C are diagrams illustrating content of the rotation speed history tables by using a histogram.
Figure 9B:
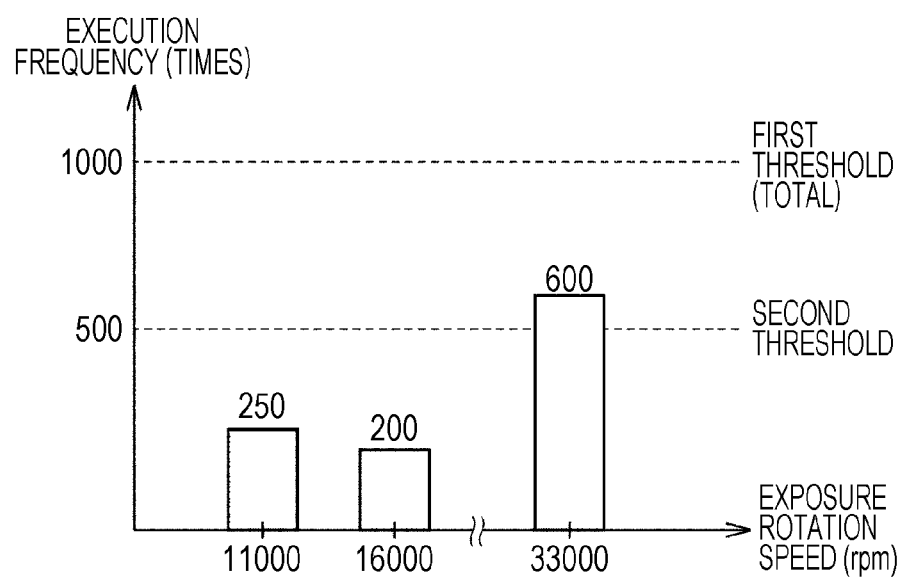
Figure 9C:
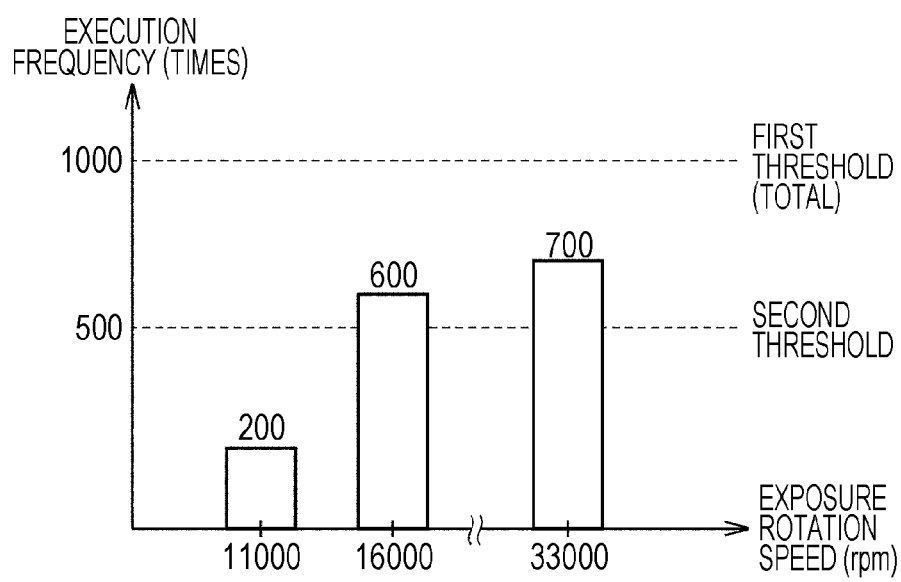

With reference to FIGS. 8A to 8C and FIGS. 9A to 9C, a method of determining the pre-exposure rotation speed will be described. FIGS. 8A to 8C are diagrams illustrating examples of the rotation speed history table D1. FIGS. 8A to 8C illustrate examples of mutually different rotation speed history tables. FIGS. 9A to 9C are diagrams illustrating content of the rotation speed history tables by using a histogram. FIGS. 9A to 9C correspond to FIGS. 8A to 8C, respectively.

As illustrated in FIGS. 8A to 8C, the rotation speed history table D1 records, as an example, the sheet type, the exposure rotation speed, and the past execution frequency of the exposure rotation speed, as history information. For example, the example illustrated in FIG. 8A indicates that 33000 rpm has been applied 300 times, 16000 rpm applied 50 times, and 11000 rpm applied 100 times, in the past execution of the exposure rotation speed.

The example illustrated in FIG. 8B indicates that the exposure rotation speed has been determined in the past such that 33000 rpm is 600 times, 16000 rpm is 200 times and 11000 rpm is 250 times. The example illustrated in FIG. 8C indicates that 33000 rpm has been applied 700 times, 16000 rpm applied 600 times, and 11000 rpm applied 200 times, in the past execution of the exposure rotation speed.

The control apparatus 101 determines the pre-exposure rotation speed so as to reduce the transition time from the pre-exposure rotation speed to the exposure rotation speed. Specifically, the pre-exposure rotation speed is determined to fall within a range between a minimum value of the rotation speed (11000 rpm in the examples illustrated in FIGS. 8A to 8C) and a maximum value of the rotation speed (33000 rpm in the example illustrated in FIGS. 8A to 8C) among the plurality of candidate rotation speeds prescribed in the rotation speed history table D1. With this arrangement, it is possible to determine the pre-exposure rotation speed in the vicinity of the rotation speed that can be determined as the exposure rotation speed, making it possible to suppress the transition time to the exposure rotation speed.

Preferably, the control apparatus 101 determines the pre-exposure rotation speed to be the exposure rotation speed or less. Specifically, the minimum value of the rotation speed (11000 rpm in the examples illustrated in FIGS. 8A to 8C) among the plurality of rotation speeds prescribed in the rotation speed history table D1 is set as the pre-exposure rotation speed. In the rotation control of the polygon motor 314, increasing the rotation speed takes more time than decreasing the rotation speed. Therefore, by using the setting of the pre-exposure rotation speed of the exposure rotation speed or less, it is further easier to suppress the transition time from the pre-exposure rotation speed to the exposure rotation speed.

As a specific method of determining the pre-exposure rotation speed, the control apparatus 101 determines whether the total number (history count) of execution frequencies of the exposure rotation speed prescribed in the rotation speed history table D1 is a predetermined first threshold or more. In a case where the total number of execution frequencies of the exposure rotation speed is less than the first threshold (hereinafter also referred to as pattern 1), meaning insufficient reliability as the execution history of the exposure rotation speed, the control apparatus 101 determines the pre-exposure rotation speed with no consideration of the execution frequency of the exposure rotation speed.

For example, in the case of the pattern 1, the control apparatus 101 determines the lowest rotation speed among the exposure rotation speeds prescribed in the rotation speed history table D1, as the pre-exposure rotation speed.

In contrast, in a case where the history count of the exposure rotation speed included in the rotation speed history table D1 is the predetermined first threshold or more (hereinafter also referred to as pattern 2), the control apparatus 101 judges that sufficient reliability as the execution history of the exposure rotation speed is assured and determines the pre-exposure rotation speed in consideration of the execution frequency of each of the exposure rotation speeds. Preferably, the control apparatus 101 determines the pre-exposure rotation speed so as to be the minimum value of the exposure rotation speed included in the history information or more and to be the maximum value of the exposure rotation speed included in the history information or less.

As an example, the control apparatus 101 determines, in the case of pattern 2, whether each of execution frequencies of each of exposure rotation speeds is a second threshold or more. When the number of exposure rotation speeds having the execution frequency of the second threshold or more is one (hereinafter also referred to as pattern 2-1), the control apparatus 101 determines the exposure rotation speed as the pre-exposure rotation speed.

Alternatively, in a case where the pattern is pattern 2 and the number of exposure rotation speeds having the execution frequency of the second threshold or more is plural (hereinafter also referred to as pattern 2-2), the control apparatus 101 determines an average value of the exposure rotation speeds having the execution frequency of the second threshold or more, as the pre-exposure rotation speed.

With reference to FIGS. 9A to 9C, the above-described method of determining the pre-exposure rotation speed will be described in accordance with a specific example. In the present embodiment, the first threshold is set to 1000 times and the second threshold is set to 500 times.

In the example illustrated in FIG. 9A, the history of the exposure rotation speed is 450 times as a total for plain sheet, thick sheet 1, and thick sheet 2. Accordingly, the history count (450 times) of the exposure rotation speed included in the rotation speed history table D1 is less than the first threshold (1000 times). In this case, the control apparatus 101 judges that this pattern corresponds to pattern 1 and determines the lowest rotation speed 11000 rpm as the pre-exposure rotation speed. Note that the value of the first threshold can be appropriately set.

In the example illustrated in FIG. 9B, the history count of exposure rotation speed is 1050 times in total for plain sheet, thick sheet 1, and thick sheet 2, and this count exceeds the first threshold (1000 times). In addition, the count 600 times which is the execution frequency of plain sheet (33000 rpm) exceeds the second threshold (500 times). In this case, the control apparatus 101 judges that this pattern corresponds to pattern 2-1 and determines the rotation speed 33000 rpm as the pre-exposure rotation speed. Note that the value of the second threshold can be appropriately set.

In the example illustrated in FIG. 9C, the history count of exposure rotation speed is 1500 times in total for plain sheet, thick sheet 1, and thick sheet 2, and this count exceeds the first threshold (1000 times). In addition, the count 600 times which is the execution frequency of thick sheet 1 (16000 rpm) and the count 700 times which is the execution frequency of plain sheet (33000 rpm) exceed the second threshold (500 times). In this case, the control apparatus 101 judges that the pattern corresponds to pattern 2-2 and determines an average value 24500 rpm of the values 33000 rpm and 16000 rpm, as the pre-exposure rotation speed.

Note that the method of determining the pre-exposure rotation speed is not limited to the above description. For example, in the case of pattern 2-2, it is allowable to use a simple average value of the plurality of values and determine the pre-exposure rotation speed as a weighted average value taking the execution frequency into consideration.

As another alternative, in a case where the history count of the exposure rotation speed included in the rotation speed history table D1 is the predetermined first threshold or more (pattern 2) and no exposure rotation speed reaches the second threshold, an average value of all the exposure rotation speeds may be determined as the pre-exposure rotation speed. With this arrangement, it is possible to determine the pre-exposure rotation speed without being influenced by the execution frequency of the specific exposure rotation speed.

[6. Processing Procedure]

Figure 10:
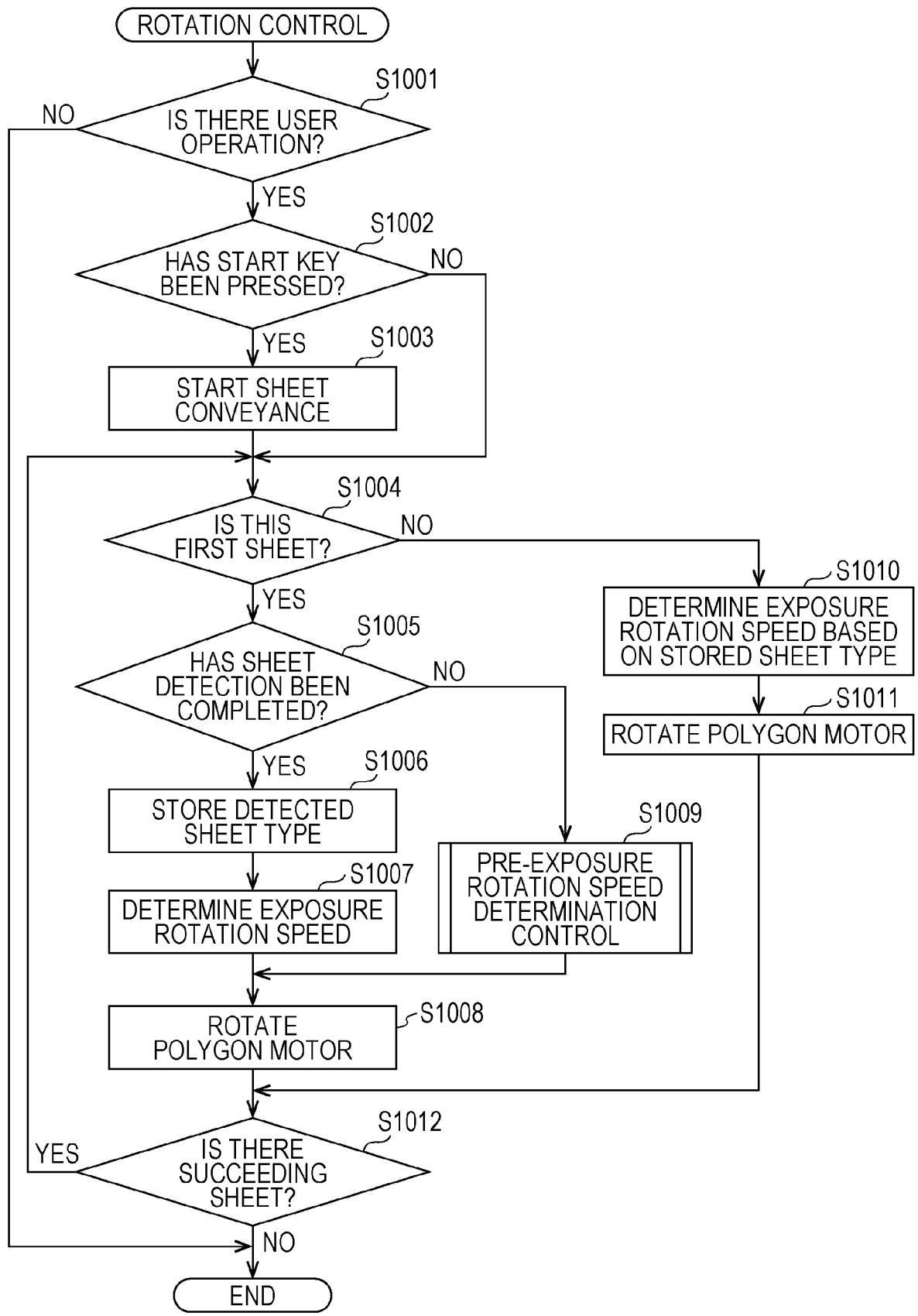
FIG. 10 is a flowchart illustrating a procedure of rotation control processing of a polygon motor.
Figure 11:
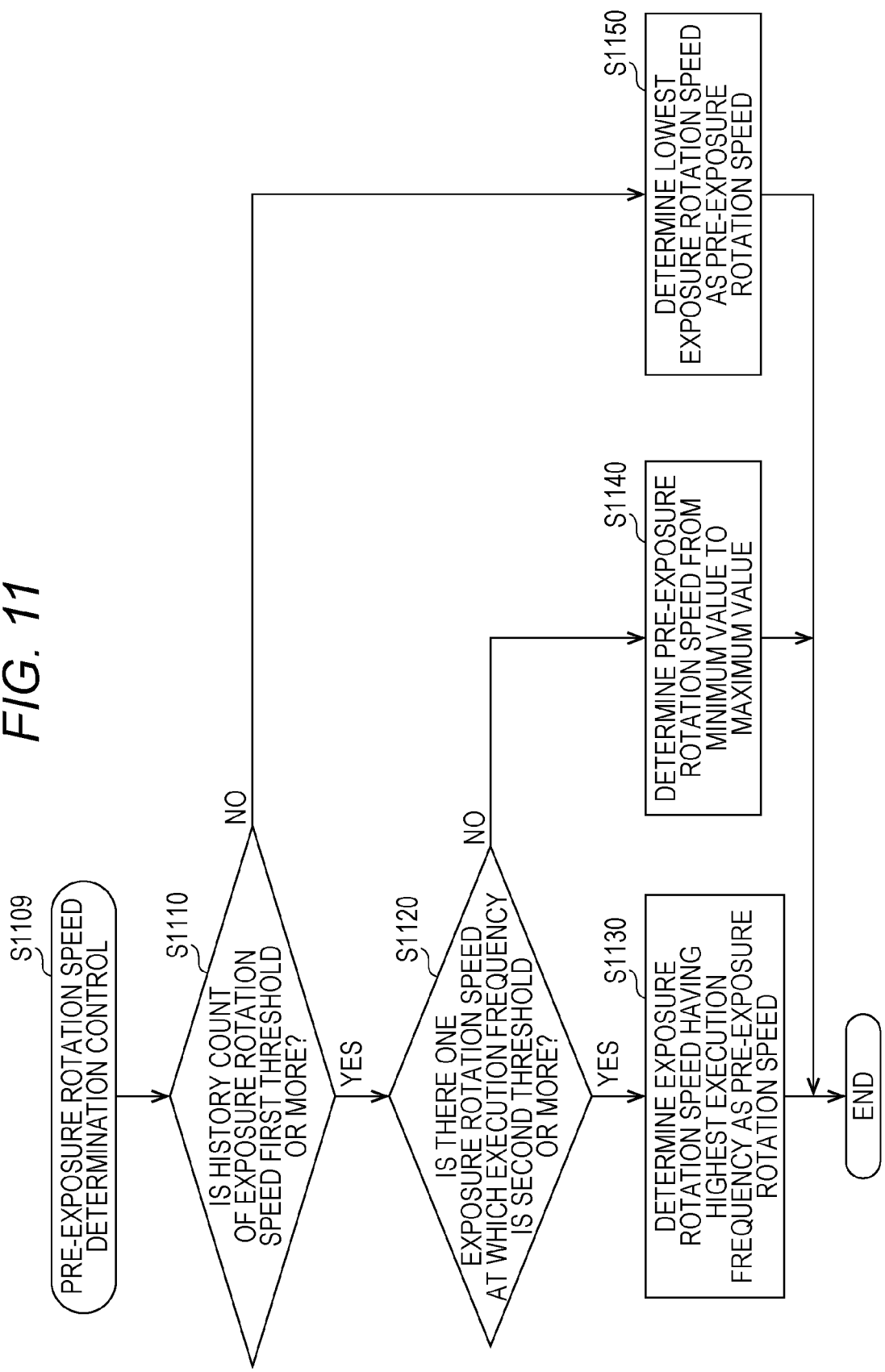
FIG. 11 is a flowchart illustrating a procedure of pre-exposure rotation speed determination control.

With reference to FIG. 10 and FIG. 11, a procedure of rotation control processing of the polygon motor 314 will be described. FIG. 10 is a flowchart illustrating a procedure of the rotation control processing of the polygon motor 314. FIG. 11 is a flowchart illustrating a procedure of pre-exposure rotation speed determination control. This processing is implemented in execution of a prescribed program by a CPU that functions as the control apparatus 101.

In step S1001, the control apparatus 101 determines the presence or absence of user's operation. In a case where there is user's operation (YES in step S1001), the control apparatus 101 advances the processing to step S1002. When determined otherwise (NO in step S1001), the control apparatus 101 finishes the processing.

In step S1002, the control apparatus 101 determines whether a start key instructing start of printing has been pressed. In a case where the start key has been pressed (YES in step S1002), the control apparatus 101 advances the processing to step S1003. When determined otherwise (NO in step S1002), the control apparatus 101 advances the processing to step S1004.

In step S1003, the control apparatus 101 starts conveying the sheet in the cassette 37 into the conveyance path 41. The control apparatus 101 advances the processing to step S1004.

In step S1004, the control apparatus 101 determines whether the sheet of the image formation target is the first sheet in the print job on the basis of the execution status data of the print job. In a case where the sheet is the first sheet (YES in step S1004), the control apparatus 101 advances the processing to step S1005. When determined otherwise (NO in step S1004), the control apparatus 101 advances the processing to step S1010.

As will be described below, in execution of printing on a plurality of sheets in the present embodiment, the control apparatus 101 detects sheet type solely for the first sheet when printing on the first sheet.

In step S1005, the control apparatus 101 determines whether the detection of the sheet type by the sheet sensor 45 has been completed. In a case where the detection of the sheet type has been completed (YES in step S1005), the control apparatus 101 advances the processing to step S1006. When determined otherwise (NO in step S1005), the control apparatus 101 advances the processing to step S1009.

In step S1006, the control apparatus 101 stores the sheet type detected by the sheet sensor 45. The control apparatus 101 advances the processing to step S1007.

In step S1007, the control apparatus 101 determines the exposure rotation speed on the basis of the detected sheet type. The control apparatus 101 advances the processing to step S1008.

Meanwhile, in step S1009, the control apparatus 101 executes the pre-exposure rotation speed determination control processing. Details of the pre-exposure rotation speed determination control processing will be described below. The control apparatus 101 advances the processing to step S1008.

In step S1008, the control apparatus 101 controls to rotate the polygon motor 314. The control apparatus 101 advances the processing to step S1012.

Meanwhile, in step S1010, the control apparatus 101 determines the exposure rotation speed on the basis of the stored sheet type. The control apparatus 101 advances the processing to step S1011.

In step S1011, the control apparatus 101 controls to rotate the polygon motor 314. The control apparatus 101 advances the processing to step S1012.

In step S1012, the control apparatus 101 determines whether there is a succeeding sheet. In a case where there is a succeeding sheet (YES in step S1012), the control apparatus 101 returns the processing to step S1004. When determined otherwise (NO in step S1012), the control apparatus 101 finishes the processing.

Referring to FIG. 11, the processing procedure of the pre-exposure rotation speed determination control (step S1009) will be described.

In step S1110, the control apparatus 101 refers to the rotation speed history table D1 and determines whether the history count of the exposure rotation speed is the first threshold or more. In a case where the history count of the exposure rotation speed is the first threshold or more (YES in step S1110), the control apparatus 101 advances the processing to step S1120. When determined otherwise (NO in step S1110), the control apparatus 101 advances the processing to step S1150.

In step S1120, the control apparatus 101 determines whether there is one exposure rotation speed having execution frequency of the exposure rotation speed of second threshold or more. In a case where there is one candidate rotation speed having the execution frequency of the exposure rotation speed of the second threshold or more (YES in step S1120), the control apparatus 101 advances the processing to step S1130. When determined otherwise (NO in step S1120), the control apparatus 101 advances the processing to step S1140.

In step S1130, the control apparatus 101 determines the exposure rotation speed having the highest execution frequency in the rotation speed history table D1 as the pre-exposure rotation speed. The control apparatus 101 finishes the processing.

In another case, the control apparatus 101 determines in step S1140 the pre-exposure rotation speed so as to be the minimum value or more and the maximum value or less of the exposure rotation speed included in the rotation speed history table D1. The control apparatus 101 finishes the processing.

In still another case, the control apparatus 101 determines in step S1150 the lowest rotation speed among the rotation speeds as the candidates for the exposure rotation speed, as the pre-exposure rotation speed. The control apparatus 101 finishes the processing.

[7. Brief Summation]

As described above, according to the present embodiment, the control apparatus 101 controls to rotate the polygon motor 314 at the pre-exposure rotation speed until the sheet sensor 45 in the conveyance path 41 detects the sheet type, and after the sheet sensor 45 detects the sheet type, the control apparatus 101 determines the exposure rotation speed on the basis of the detected sheet type and controls to rotate the polygon motor 314 at the determined exposure rotation speed.

With the above-described configuration, the polygon motor 314 is controlled to be rotated at the pre-exposure rotation speed before determination of the exposure rotation speed based on the detection of the sheet type, making it possible to promptly start up the polygon motor 314.

Second Embodiment

[1. Overview]

Hereinafter, a second embodiment will be described. In contrast to the first embodiment in which the polygon motor 314 is controlled on the premise that the sheet type is detected, the second embodiment differs from the first embodiment in that there are provided, as the operation modes, a first mode of not detecting sheet type and a second mode of detecting the sheet type, and that control processing related to the rotation of the polygon motor 314 is mutually different in the first mode and the second mode.

Here, the control processing related to rotation represents control of various parameter values for controlling the rotation of the polygon motor 314, and can include, for example, control of the current value to be applied to the polygon motor 314 and control of the voltage value to be applied to the polygon motor 314. In the present embodiment, the same reference numerals as those of the image forming apparatus 100 are given to the similar configurations as those of the image forming apparatus 100 according to the above-described embodiment. Therefore, duplicate description will be omitted.

[2. Details]

Figure 12:
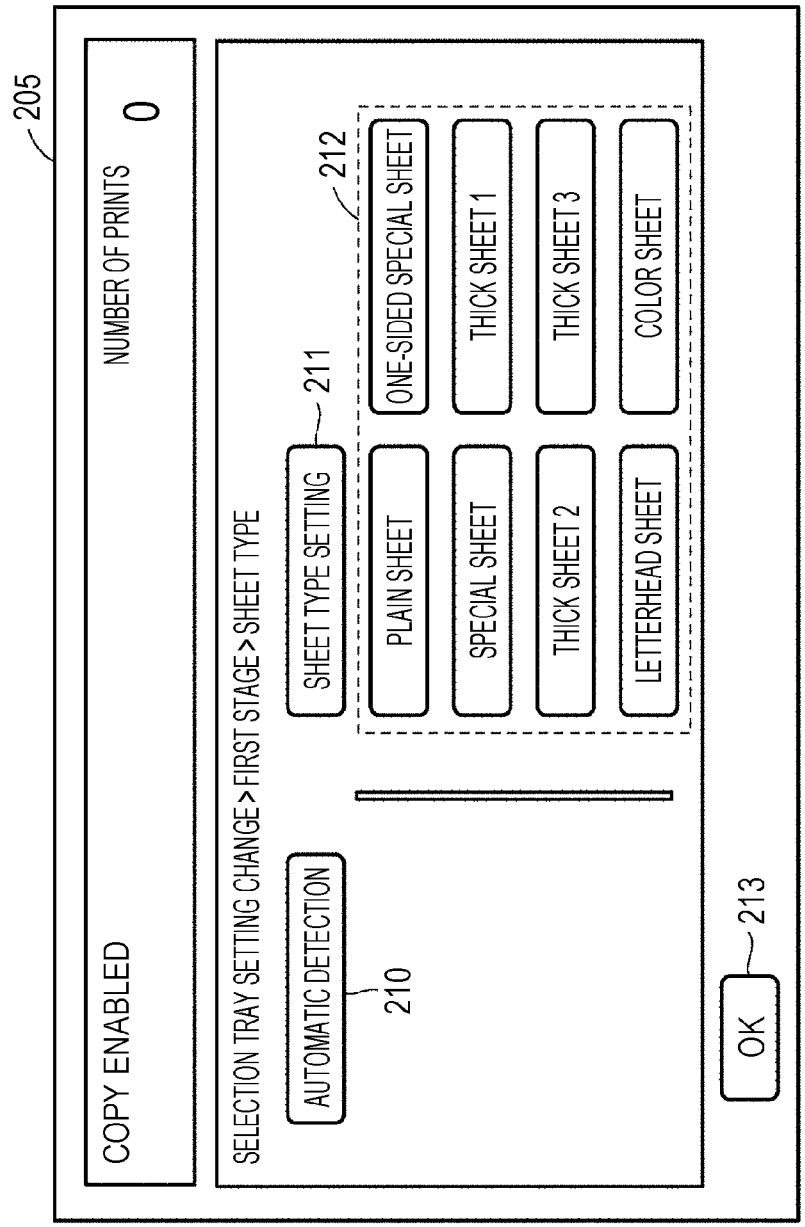
FIG. 12 is an example of display of an operation panel provided in an image forming apparatus according to a second embodiment.

FIG. 12 is an example of display of an operation panel 205 of an image forming apparatus 200 according to the second embodiment. As illustrated in FIG. 12, the operation panel 205 displays a screen that enables selection from sheet type setting using automatic detection or sheet type setting performed by a user.

Here, when the user selects an automatic detection button 210 and presses an OK button 213, the mode is set to the second mode in which the sheet type is detected by the sheet sensor 45. In contrast, when the user presses a sheet type setting button 211, selects one of sheet type buttons 212, and presses the OK button 213, the mode is set to the first mode in which the sheet type is not detected by the sheet sensor 45. In this manner, the image forming apparatus 200 is configured to allow the user to select either the first mode or the second mode.

The rotation control of the polygon motor 314 according to the second embodiment will be described with reference to FIGS. 13A and 13B. FIGS. 13A and 13B are timing charts illustrating an overview of rotation control of the polygon motor 314 according to the second embodiment.

FIG. 13A illustrates a timing chart in the first mode. In the image forming apparatus 200 in the first mode, the polygon motor 314 is rotated at a predetermined rotation speed in response to user's certain operation on the operation panel 205 at an arbitrary timing (t=T6).

Thereafter, in response to the depression of the start key to instruct the start of printing (t=T7) by the user, sheet feeding in the cassette 37 is started and the image forming unit 1 is started up. Furthermore, the rotation speed of the polygon motor 314 is switched to be the exposure rotation speed corresponding to the sheet type set by the user at the time of printing instruction, and after the lapse of a predetermined time (t=T8), switching of the rotation speed of the polygon motor 314 is completed.

Thereafter, when the feeding of the sheet in the conveyance path 41 is completed and the sheet stands ready at the registration roller 40 (t=T9), and then, the exposure of the photoreceptor 10 in the print head 350 is started (t=T10). At arrival of a conveyance timing (t=T11) of the sheet to the secondary transfer roller 33, the conveyance of the sheet is restarted by the registration roller 40, and a toner image is formed on the sheet.

FIG. 13B illustrates a timing chart in the second mode. In the image forming apparatus 200 in the second mode, sheet feeding in the cassette 37 is started from a timing (t=T7') when the user presses a start key to instruct start of printing.

Thereafter, the sheet type detection by the sheet sensor 45 is performed (t=T9') for the sheet conveyed in the conveyance path. When the sheet type is detected by the sheet sensor 45, the exposure rotation speed is determined on the basis of the detected sheet type, and the polygon motor 314 is started up. The sheet in the conveyance path 41 stands ready at the registration roller 40 for adjusting the timing of being fed out to the secondary transfer roller 33.

Thereafter, at completion of startup of the polygon motor 314 to the exposure rotation speed (t=T10'), the exposure to the photoreceptor 10 in the print head 350 is started. At arrival of a conveyance timing (t=T11') of the sheet to the secondary transfer roller 33, the conveyance of the sheet is restarted by the registration roller 40, and a toner image is formed on the sheet.

Figure 14A:
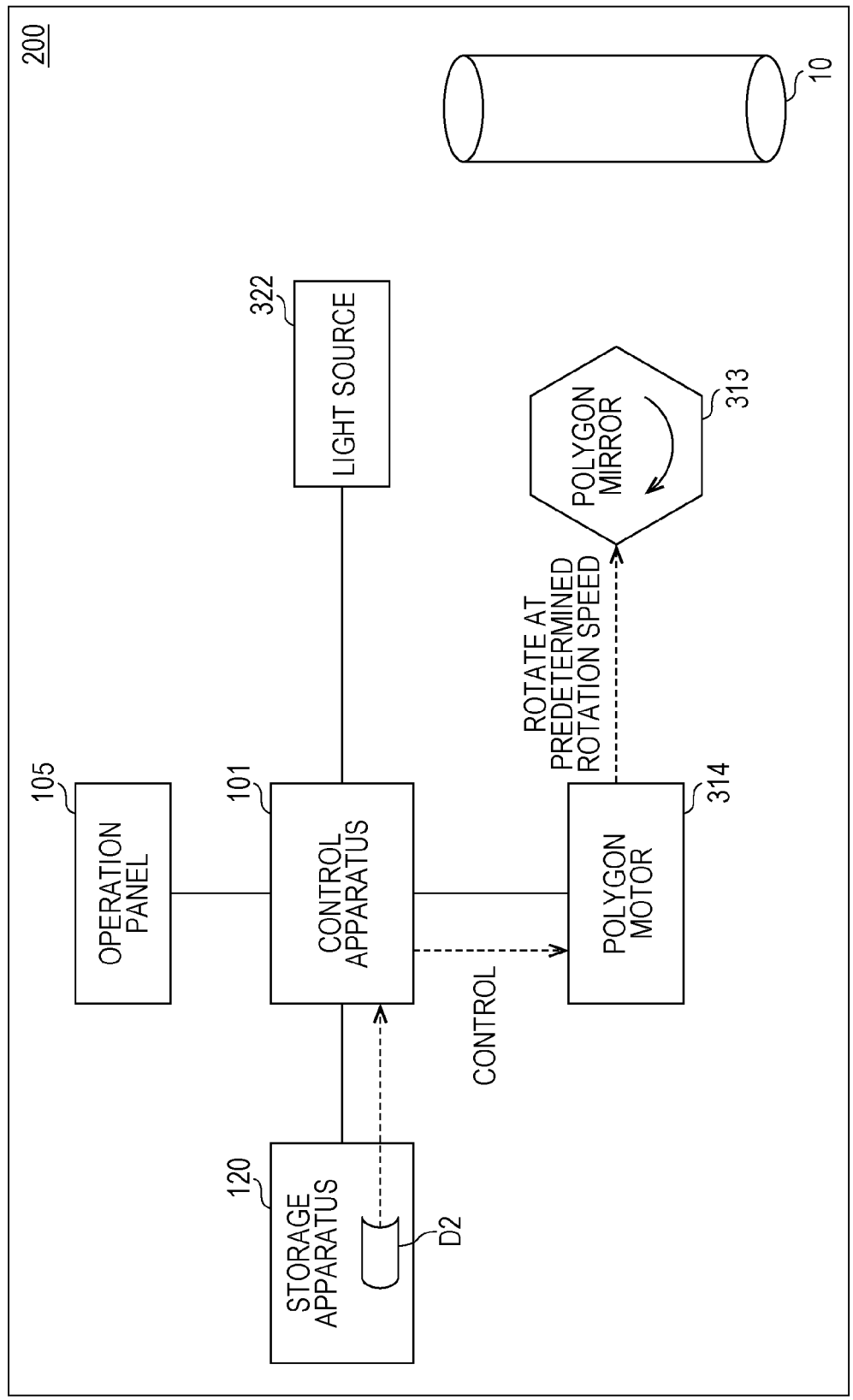
FIGS. 14A and 14B are diagrams illustrating a mode of rotation control of a polygon motor in a first mode.
Figure 14B:
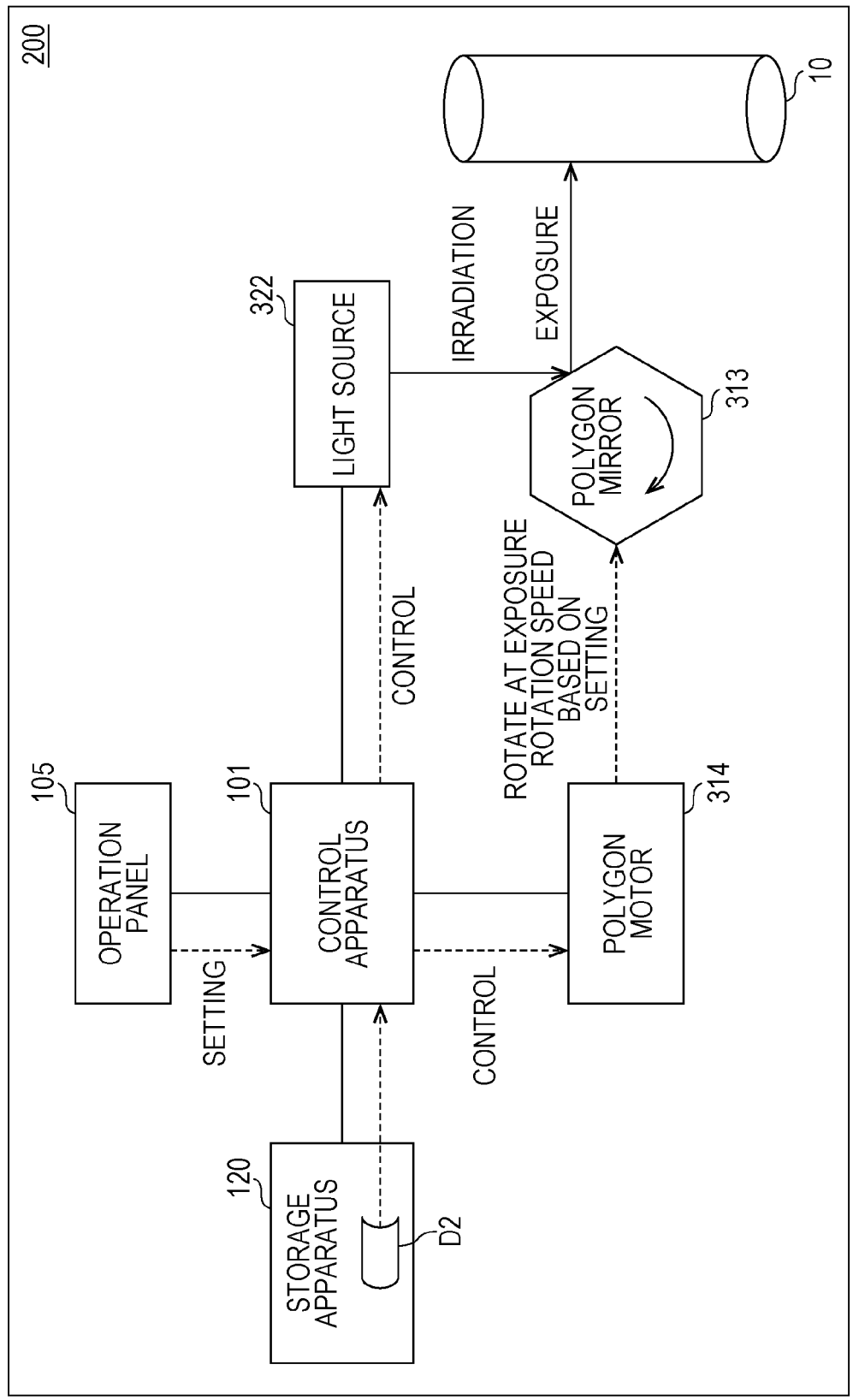
Figure 15A:
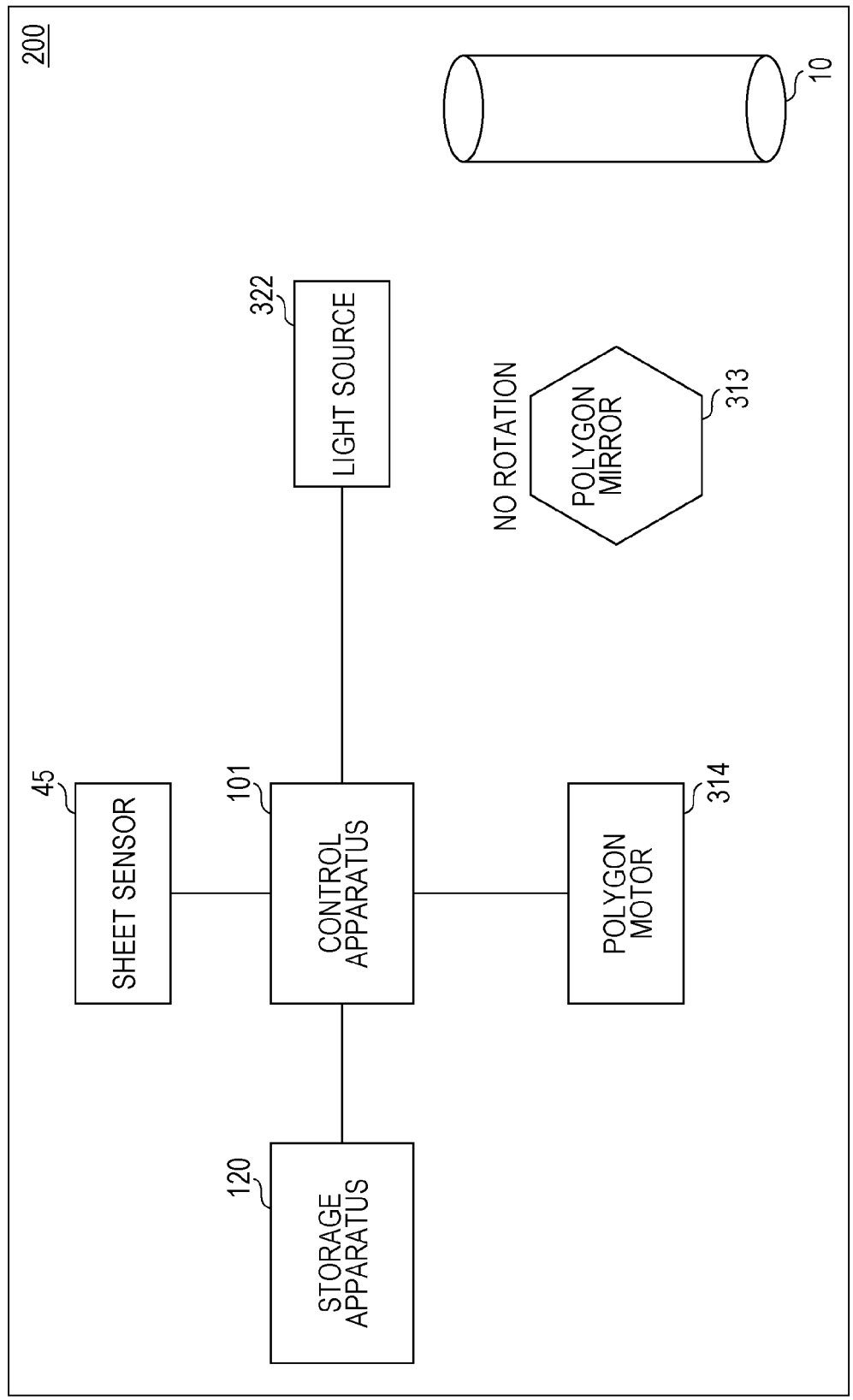
FIGS. 15A and 15B are diagrams illustrating a mode of rotation control of a polygon motor in a second mode.
Figure 15B:
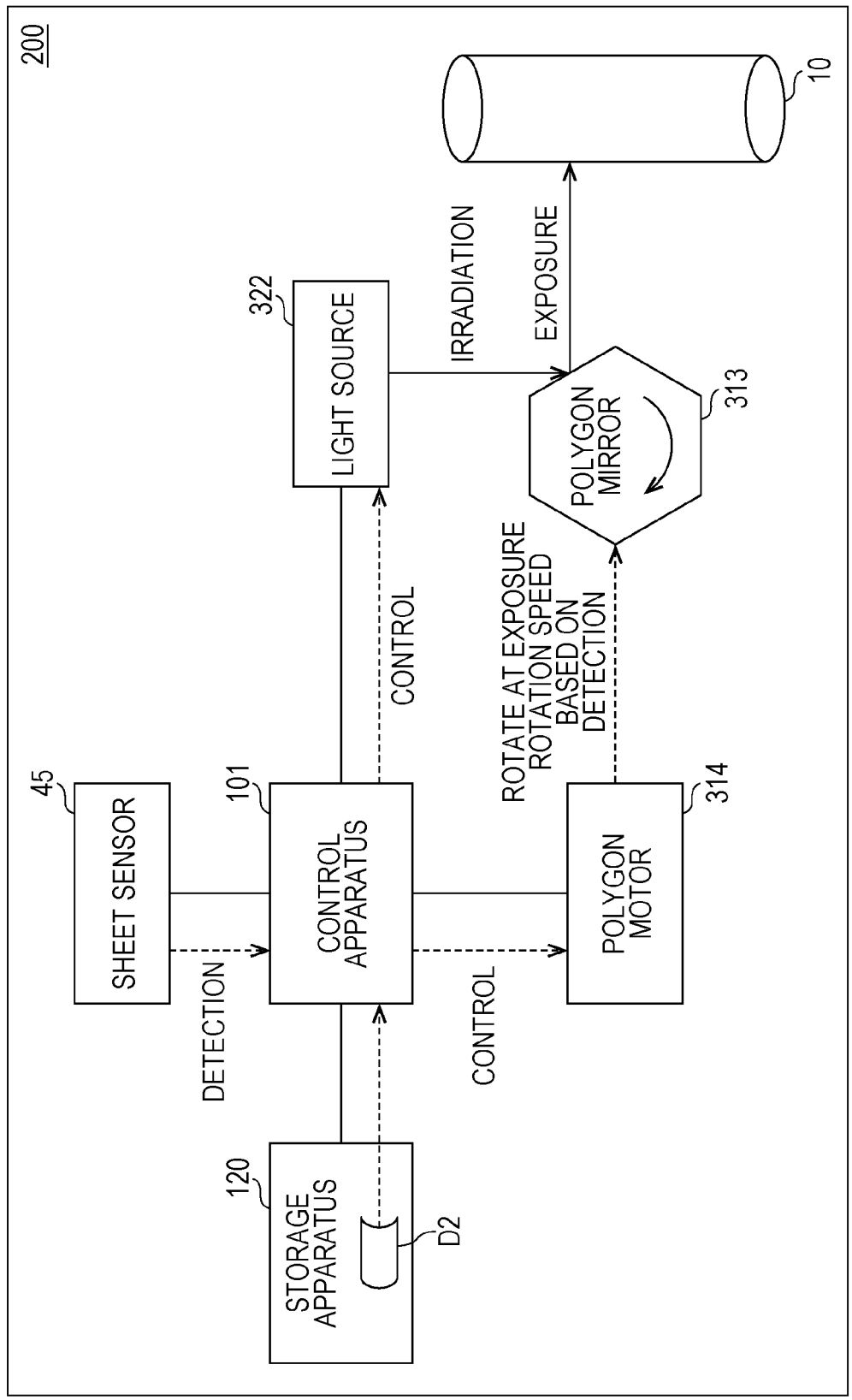

A functional configuration for rotation control of the polygon motor 314 according to the second embodiment will be described with reference to FIGS. 14A and 14B and FIGS. 15A and 15B. FIGS. 14A and 14B are functional block diagrams in the rotation control of the polygon motor 314 in the first mode. FIGS. 15A and 15B are functional block diagrams in the rotation control of the polygon motor 314 in the second mode.

With reference to FIGS. 14A and 14B, a functional configuration for implementing the rotation control in the first mode will be described. As illustrated in FIG. 14A, the control apparatus 201 of the image forming apparatus 200 controls to rotate the polygon motor 314 at a predetermined rotation speed until exposure of the photoreceptor 10 is started. Here, the predetermined rotation speed can be, for example, the exposure rotation speed in a case where the sheet type defined in the sheet type table D2 is plain sheet.

As illustrated in FIG. 14B, when the exposure of the photoreceptor 10 is started, the control apparatus 201 determines the exposure rotation speed corresponding to the set sheet type on the basis of the sheet type set on the operation panel 105 and the sheet type table D2. The control apparatus 201 controls to rotate the polygon motor 314 at the determined exposure rotation speed.

With reference to FIGS. 15A and 15B, a functional configuration for implementing the rotation control in the second mode will be described. As illustrated in FIG. 15A, the control apparatus 201 of the image forming apparatus 200 controls to inhibit rotation of the polygon motor 314 until the sheet sensor 45 in the conveyance path 41 detects the sheet type.

As illustrated in FIG. 15B, after detection of the sheet type by the sheet sensor 45, the control apparatus 201 determines the exposure rotation speed corresponding to the set sheet type on the basis of the detected sheet type and the sheet type table D2 stored in the storage apparatus 120. The control apparatus 201 controls to rotate the polygon motor 314 at the determined exposure rotation speed.

[3. Processing Procedure]

Figure 16:
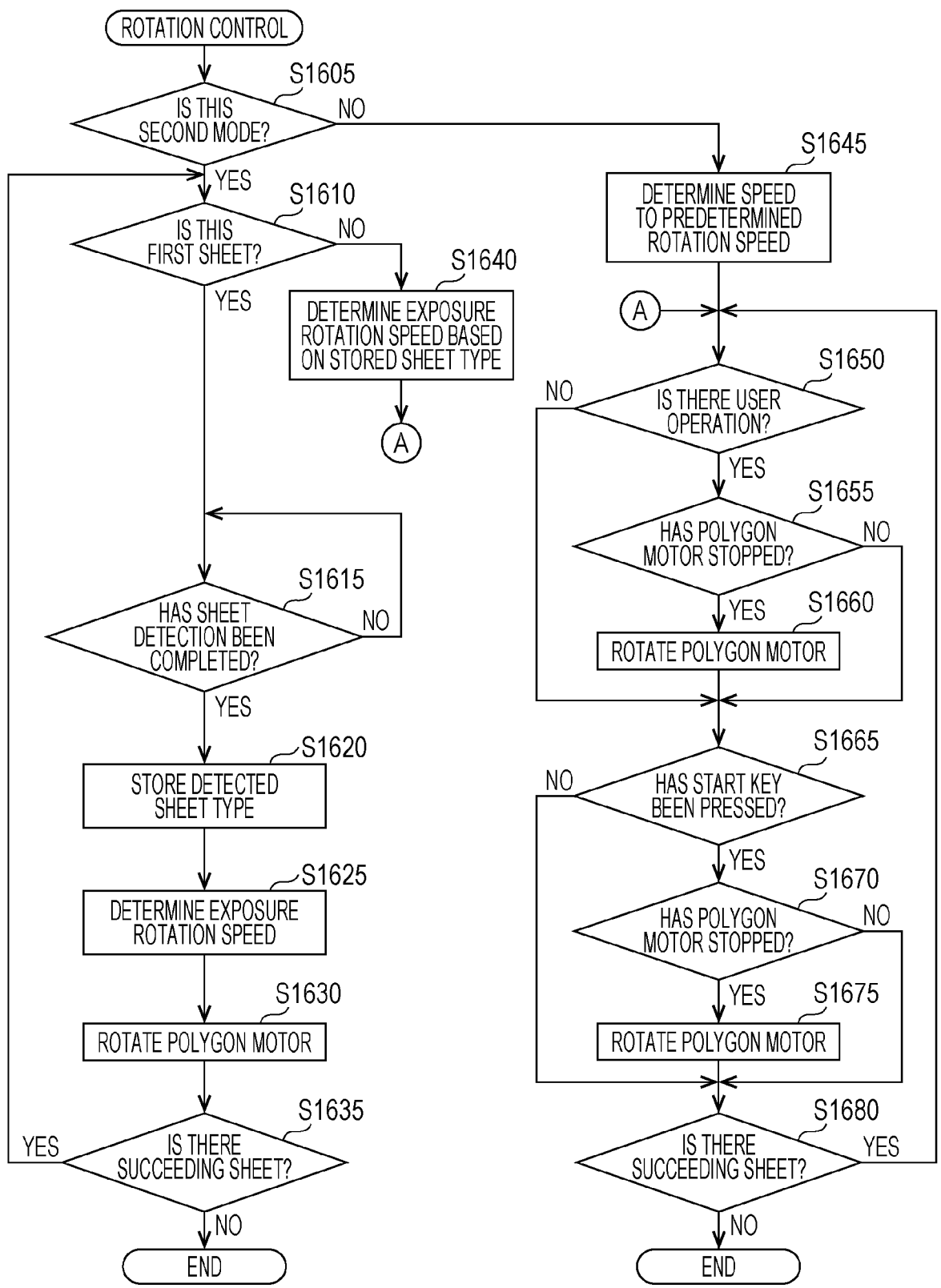
FIG. 16 is a flowchart illustrating a procedure of rotation control processing of a polygon motor according to the second embodiment.

A procedure of the rotation control processing of the polygon motor 314 according to the second embodiment will be described with reference to FIG. 16. FIG. 16 is a flowchart illustrating a procedure of the rotation control processing of the polygon motor 314 according to the second embodiment. This processing is implemented in execution of a prescribed program by a CPU that functions as the control apparatus 201.

In step S1605, the control apparatus 201 determines whether the operation mode is the second mode. In a case where the operation mode is the second mode (YES in step S1605), the control apparatus 201 advances the processing to step S1610. When determined otherwise (NO in step S1605), the control apparatus 201 advances the processing to step S1645.

In step S1610, the control apparatus 201 determines whether the sheet of the image formation target is the first sheet in the print job. In a case where the sheet is the first sheet (YES in step S1610), the control apparatus 201 advances the processing to step S1615. When determined otherwise (NO in step S1610), the control apparatus 201 advances the processing to step S1640.

As will be described below, in execution of printing on a plurality of sheets in the second mode of the present embodiment, the control apparatus 201 inhibits rotation of the polygon motor 314 before start of exposure to the photoreceptor 10 when the first sheet is going to be printed, and then, after the sheet sensor 45 has detected the type of the sheet, the control apparatus 201 controls to rotate the polygon motor 314 at a speed determined on the basis of the sheet type detected by the sheet sensor 45.

In addition, at execution of printing on the second and succeeding sheets, the control apparatus 201 controls to rotate the polygon motor 314 at the exposure rotation speed determined on the basis of the sheet type detected from the first sheet before starting the exposure on the photoreceptor 10.

In step S1615, the control apparatus 201 determines whether detection of the sheet type has been completed. In a case where the detection of the sheet type has been completed (YES in step S1615), the control apparatus 201 advances the processing to step S1620. When determined otherwise (NO in step S1615), the control apparatus 201 repeats step S1615.

In step S1620, the control apparatus 201 stores the detected sheet type in the storage apparatus 120. The control apparatus 201 advances the processing to step S1625.

In step S1625, the control apparatus 201 determines the rotation speed corresponding to the detected sheet type as the rotation speed of the polygon motor 314. The control apparatus 201 advances the processing to step S1630.

In step S1630, the control apparatus 201 controls to rotate the polygon motor 314. The control apparatus 201 advances the processing to step S1635.

In step S1635, the control apparatus 201 determines whether image formation is to be performed on a succeeding sheet. In a case where image formation is to be performed on a succeeding sheet (YES in step S1635), the control apparatus 201 returns the processing to step S1610. When determined otherwise (NO in step S1635), the control apparatus 201 finishes the processing.

On the other hand, in step S1640, the control apparatus 201 determines the rotation speed corresponding to the sheet type stored in the storage apparatus 120 as the exposure rotation speed of the polygon motor 314. The control apparatus 201 advances the processing to step S1650.

Meanwhile, the control apparatus 201 sets in step S1645 a predetermined speed as the rotation speed of the polygon motor 314. The control apparatus 201 advances the processing to step S1650.

In step S1650, the control apparatus 201 determines whether there is user's operation on the operation panel 105. In a case where there is user's operation (YES in step S1650), the control apparatus 201 advances the processing to step S1655. When determined otherwise ((NO in step S1650), the processing proceeds to step S1655.

In step S1655, the control apparatus 201 determines whether the polygon motor 314 is stopped. In a case where the polygon motor 314 is stopped (YES in step S1655), the control apparatus 201 advances the processing to step S1660. When determined otherwise (NO in step S1655), the control apparatus 201 advances the processing to step S1665.

In step S1660, the control apparatus 201 controls to rotate the polygon motor 314. The control apparatus 201 advances the processing to step S1665.

In step S1665, the control apparatus 201 determines whether the start key has been pressed. In a case where the start key has been pressed (YES in step S1665), the control apparatus 201 advances the processing to step S1670. When determined otherwise (NO in step S1665), the control apparatus 201 advances the processing to step S1680.

In step S1670, the control apparatus 201 determines whether the polygon motor 314 is stopped. In a case where the polygon motor 314 is stopped (YES in step S1670), the control apparatus 201 advances the processing to step S1675. When determined otherwise (NO in step S1670), the control apparatus 201 advances the processing to step S1680.

In step S1675, the control apparatus 201 controls to rotate the polygon motor 314. The control apparatus 201 advances the processing to step S1680.

In step S1680, the control apparatus 201 determines whether image formation is to be performed on a succeeding sheet. In a case where image formation is to be performed on a succeeding sheet (YES in step S1680), the control apparatus 201 returns the processing to step S1650. When determined otherwise (NO in step S1680), the control apparatus 201 finishes the processing.

[4. Brief Summation]

As described above, the image forming apparatus 200 includes, as operation modes, the first mode of not detecting the sheet type and the second mode of detecting the sheet type. The control apparatus 201 performs control processing related to the rotation of the polygon motor, having difference between the first mode and the second mode.

With the above configuration, more appropriate polygon motor control can be realized in accordance with the presence or absence of sheet detection processing. This enhances user convenience and eliminates unnecessary rotation control of the polygon motor, enabling longer life of expendables.

Third Embodiment

[1. Overview]

Hereinafter, a third embodiment will be described. An image forming apparatus 300 according to the third embodiment includes, as operation modes, a first mode of not detecting the sheet type and the second mode of detecting the sheet type. In the second mode, the control apparatus 301 controls to rotate the polygon motor 314 at the pre-exposure rotation speed until the sheet sensor 45 detects the sheet type, and after the sheet sensor 45 detects the sheet type, the control apparatus 301 determines the exposure rotation speed on the basis of the detected sheet type and controls to rotate the polygon motor 314 at the determined exposure rotation speed. Note that the image forming apparatus 300 according to the present embodiment is realized by a similar configuration as that of the image forming apparatus 100 according to the above-described embodiment. Therefore, duplicate description will be omitted.

[2. Details]

Figure 17:
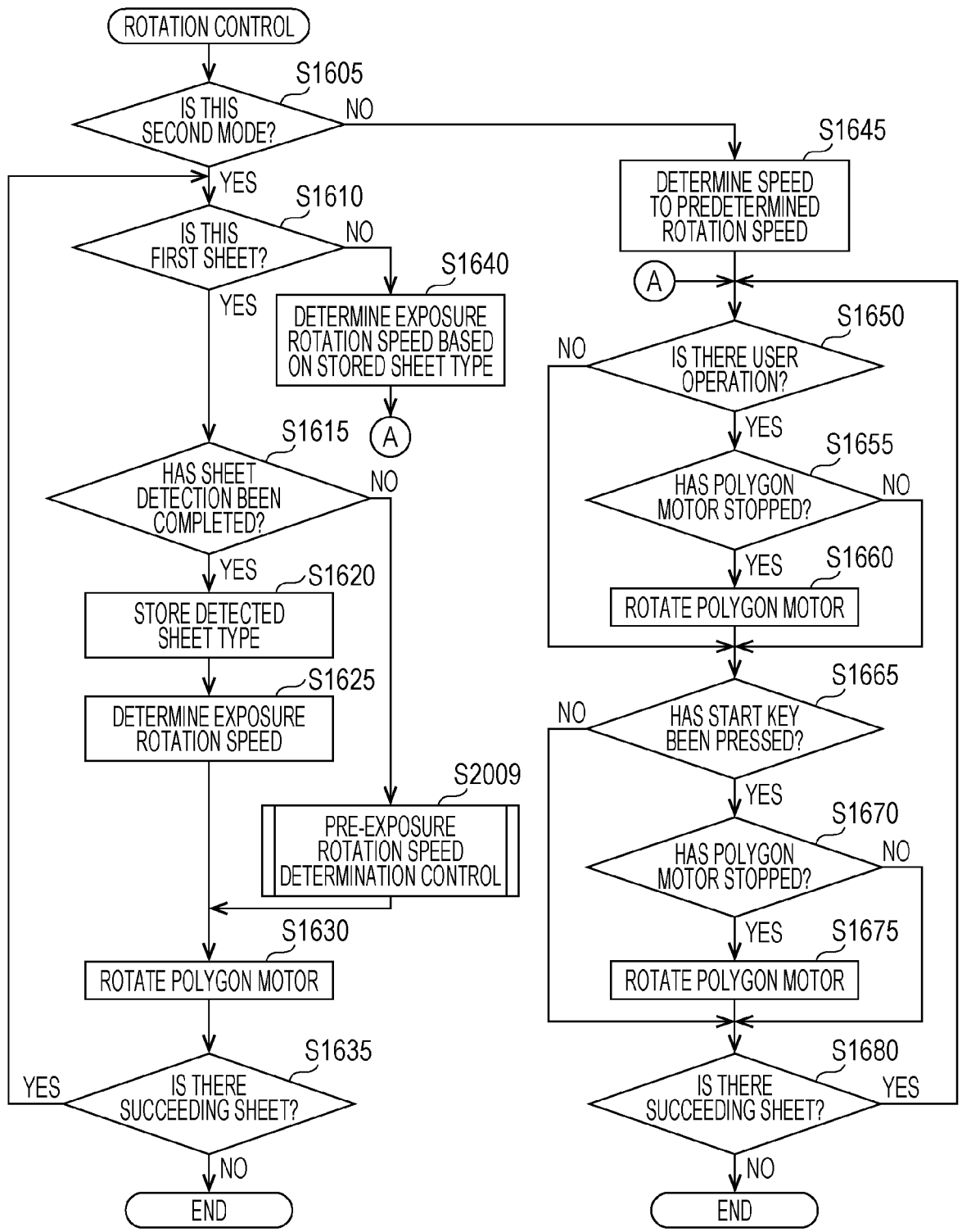
FIG. 17 is a flowchart illustrating a procedure of rotation control processing of a polygon motor according to a third embodiment.
Figure 18:
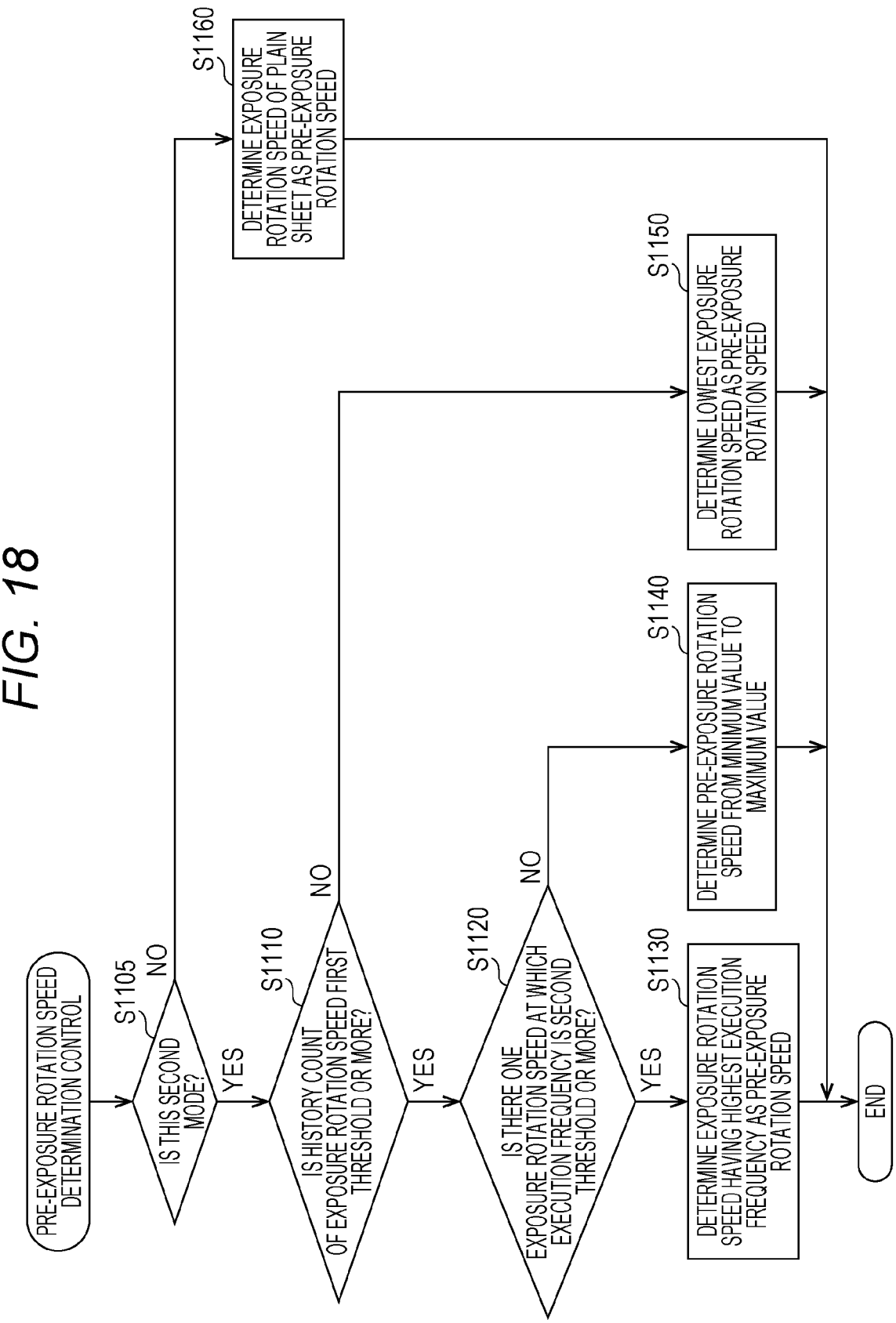
FIG. 18 is a flowchart illustrating a procedure of first rotation speed determination control according to the third embodiment.

With reference to FIGS. 17 and 18, the procedure of the rotation control processing of the polygon motor 314 will be described. FIG. 17 is a flowchart illustrating a procedure of the rotation control processing of the polygon motor 314 according to the third embodiment. FIG. 18 is a flowchart illustrating a procedure of the pre-exposure rotation speed determination control according to the third embodiment. This processing is implemented in execution of a prescribed program by a CPU that functions as the control apparatus 301.

In FIG. 17, description of the same processing as in the second embodiment will not be repeated. When the control apparatus 301 determined in step S1615 that the detection of the sheet type has not been completed (NO in step S1615), the control apparatus 301 advances the processing to step S2009. In step S2009, pre-exposure rotation speed determination control processing is performed.

With reference to FIG. 18, pre-exposure rotation speed determination control processing (step S2009) in the present embodiment will be described. In FIG. 18, description of the same processing as in the first embodiment will not be repeated. In step S1105, the control apparatus 301 determines whether the operation mode is the second mode. In a case where the operation mode is the second mode (YES in step S1105), the control apparatus 301 advances the processing to step S1110. When determined otherwise (NO in step S1105), the control apparatus 301 advances the processing to step S1160.

In step S1160, the control apparatus 301 determines a predetermined rotation speed (for example, an exposure rotation speed of plain sheet) as the pre-exposure rotation speed. The control apparatus 301 finishes the processing.

[3. Brief Summation]

As described above, in the third embodiment, the control apparatus 301 controls to rotate the polygon motor 314 in the second mode of detecting the sheet type at the pre-exposure rotation speed determined before the exposure on the basis of the rotation speed history table D1.

With the above configuration, it is possible to promptly start up the polygon motor while realizing more appropriate polygon motor control according to the presence or absence of sheet detection processing.

Other Embodiments

In the above embodiments, the sheet type of is detected solely for the first sheet of the print job when a print job onto a plurality of sheets is to be executed. Alternatively, it is also possible to configure to perform sheet type detection solely for the first sheet set in the cassette 37. With this configuration, it is possible to suppress the frequency of sheet detection processing, as compared with the case of detecting the sheet type for the first sheet of the print job. In this case, for example, determination can be made on the basis of the presence or absence of lift-up of the sheet tray after setting the sheet in the cassette 37. In this case, it is also possible to obtain similar effects as the above embodiment.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and scope, which are equivalent to the scope of claims

What is claimed is:

1. An image forming apparatus comprising:
a light source that emits a laser beam;
a polygon mirror that reflects the laser beam;
a photoreceptor that is to be exposed to the laser beam reflected by the polygon mirror;
a motor that rotates the polygon mirror; and
a hardware processor capable of detecting sheet type, that is, type of a sheet conveyed in the image forming apparatus,
wherein the hardware processor controls to
rotate the motor at a first rotation speed until the sheet type is detected and before exposure to the photoreceptor is started, and
rotate the motor at a second rotation speed determined on the basis of the sheet type after exposure to the photoreceptor is started and the sheet type is detected.

2. The image forming apparatus according to claim 1, wherein the hardware processor determines the first rotation speed so as to reduce a transition time from the first rotation speed to the second rotation speed.

3. The image forming apparatus according to claim 1, wherein the first rotation speed is the second rotation speed or less.

4. The image forming apparatus according to claim 1, wherein the hardware processor determines a lowest rotation speed as the first rotation speed from among a plurality of predetermined candidate rotation speeds that are candidates for the second rotation speed.

5. The image forming apparatus according to claim 4, further comprising a storage apparatus that stores a history of the second rotation speed determined by the hardware processor, as history information,
wherein in a case where history count of the second rotation speed included in the history information is less than a predetermined first threshold, the hardware processor determines the lowest rotation speed among the plurality of candidate rotation speeds, as the first rotation speed.

6. The image forming apparatus according to claim 1, further comprising a storage apparatus that stores a history of the second rotation speed determined by the hardware processor, as history information,
wherein the hardware processor determines the first rotation speed to be a minimum value of the second rotation speed included in the history information or more and to be a maximum value of the second rotation speed included in the history information or less.

7. The image forming apparatus according to claim 6, wherein the hardware processor determines the second rotation speed having the highest execution frequency in the history information, as the first rotation speed.

8. The image forming apparatus according to claim 7, wherein the hardware processor determines the rotation speed corresponding to the maximum execution frequency as the first rotation speed when the history count of the second rotation speed included in the history information is a predetermined first threshold or more and one of the execution frequencies for each of the rotation speeds with respect to the second rotation speed included in the history information is a predetermined second threshold or more.

9. The image forming apparatus according to claim 6, wherein the hardware processor determines an average value of the second rotation speeds having the execution frequency of a predetermined second threshold or more, as the first rotation speed.

10. The image forming apparatus according to claim 9, wherein the history information includes an execution frequency of the second rotation speed for each of a plurality of different rotation speeds, and
when the history count of the second rotation speed included in the history information is a predetermined first threshold or more and there is a plurality of execution frequencies of the predetermined second threshold or more among the plurality of execution frequencies included in the history information, the hardware processor determines an average value of the second rotation speeds having the execution frequency of the predetermined second threshold or more, as the first rotation speed.

11. The image forming apparatus according to claim 1, further comprising:
a sheet feed tray that stores the sheet;
a sheet sensor that detects grammage of the sheet; and
a registration roller that controls a conveyance timing of the sheet conveyed in the image forming apparatus,
wherein the hardware processor detects the sheet type on the basis of a detection result obtained by the sheet sensor, and
the sheet sensor is arranged to detect grammage of the sheet conveyed between the sheet feed tray and the registration roller.

12. The image forming apparatus according to claim 1, wherein the hardware processor detects the sheet type of the first sheet alone in a case where printing on a plurality of sheets is executed.

13. The image forming apparatus according to claim 1, further comprising
an operation unit for receiving an operation from a user,
wherein the hardware processor receives an operation from a user by the operation unit, and then rotates the motor at the first rotation speed until the sheet type is detected, before exposure to the photoreceptor is started.

14. The image forming apparatus according to claim 1, further comprising a storage unit for storing, for each sheet type, information corresponding to a sheet type and a rotation speed of the motor depending on the sheet type, wherein the hardware processor sets a slowest rotation speed of the motor as the first rotation speed, from among information for each of the sheet types stored in the storage unit.

15. The image forming apparatus according to claim 1, wherein the first rotation speed is based on a history of second rotation speeds previously determined by the hardware processor.

16. A non-transitory recording medium storing a computer readable control program used in an image forming apparatus comprising:

a light source that emits a laser beam;

a polygon mirror that reflects the laser beam;

a photoreceptor that is to be exposed to the laser beam reflected by the polygon mirror;

a motor that rotates the polygon mirror; and a hardware processor capable of detecting sheet type, that is, type of a sheet conveyed in the image forming apparatus, wherein the control program causes the hardware processor to perform:

rotating the motor at a first rotation speed until the sheet type is detected and before exposure to the photoreceptor is started, and rotate the motor at a second rotation speed determined on the basis of the sheet type after exposure to the photoreceptor is started and the sheet type is detected.

* * * * *